(12) United States Patent  (10) Patent No.: US 9,395,600 B2
Yamashita                   (45) Date of Patent:     Jul. 19, 2016

(54) ILLUMINATION DEVICE AND ILLUMINATION CONTROL METHOD

(71) Applicant: CANON KABUSHIKI KAISHA, Tokyo (JP)

(72) Inventor: Kenichiro Yamashita, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/470,799

(22) Filed: Aug. 27, 2014

(65) Prior Publication Data

US 2015/0062861 A1  Mar. 5, 2015

(30) Foreign Application Priority Data

Aug. 30, 2013  (JP) .................................. 2013-179271

(51) Int. Cl.
G03B 15/03  (2006.01)
G03B 15/05  (2006.01)

(52) U.S. Cl.
CPC ........ G03B 15/05 (2013.01); *G03B 2215/0528* (2013.01)

(58) Field of Classification Search
CPC ................... G03B 15/05; G03B 17/04; G03B 2215/0514; G03B 2215/0585; G03B 15/041; G03B 2215/0553; G03B 2215/0589
See application file for complete search history.

(56) References Cited

U.S. PATENT DOCUMENTS

| 2014/0240950 A1* | 8/2014 | Ueda ..................... G03B 15/05 362/3 |
| 2015/0036042 A1* | 2/2015 | Umehara ............... G03B 15/05 348/371 |
| 2015/0109754 A1* | 4/2015 | Takenaka .............. G03B 15/03 362/4 |
| 2015/0131257 A1* | 5/2015 | Kaimoto ................ G03B 15/05 362/5 |
| 2015/0156389 A1* | 6/2015 | Umehara ............... G03B 15/05 348/242 |
| 2015/0185588 A1* | 7/2015 | Saita ..................... F21V 14/025 362/18 |
| 2015/0185589 A1* | 7/2015 | Ooyama ................ G03B 15/05 362/5 |

FOREIGN PATENT DOCUMENTS

| JP | 2008-180913 A | 8/2008 |
| JP | 2009-75340 A  | 4/2009 |
| JP | 2011-170014 A | 9/2011 |

OTHER PUBLICATIONS

Kaimoto et al., Japanese Patent Publication 2008-180913, Jul. 2008, machine translation.*

* cited by examiner

*Primary Examiner* — Tracie Y Green
(74) *Attorney, Agent, or Firm* — Canon USA, Inc. IP Division

(57) ABSTRACT

An illumination device selects any one of a first mode, in which, when a detection unit detects a rotation of a second casing even when a second casing is not rotated by a drive unit, a control unit causes the drive unit to rotate the second casing to a position of the second casing before the rotation of the second casing is detected by the detection unit or a second mode, in which, when the detection unit detects the rotation of the second casing even when the second casing is not rotated by the drive unit, the control unit does not cause the drive unit to rotate the second casing to the position of the second casing before the rotation of the second casing is detected by the detection unit.

8 Claims, 14 Drawing Sheets

FIG.8A

| RIGHT AND LEFT ANGLE DETECTION (LEFT ROTATIONAL DIRECTION) | | | | | | | | | | | | | | | | | | | | | | | | |
|---|---|---|---|---|---|---|---|---|---|---|---|---|---|---|---|---|---|---|---|---|---|---|---|---|
| STANDARD ANGLE | ◆ | | | ◆ | | | ◆ | | | ◆ | | ◆ | ◆ | | | | | | | | | | | ◆ |
| ROTATIONAL ANGLE | 180 | | 165 | | 150 | | 135 | | 120 | | 105 | | 90 | | 75 | | 60 | | 45 | | 30 | | 15 | | 0 |
| bit1 | 0 | 0 | 0 | 0 | 1 | 1 | 1 | 1 | 1 | 0 | 0 | 0 | 1 | 1 | 1 | 0 | 0 | 0 | 0 | 1 | 1 | 1 | 0 | 0 |
| bit2 | 1 | 1 | 0 | 0 | 0 | 0 | 1 | 1 | 1 | 1 | 1 | 0 | 0 | 0 | 1 | 1 | 1 | 1 | 0 | 0 | 1 | 1 | 1 | 1 |
| bit3 | 1 | 1 | 1 | 0 | 0 | 0 | 0 | 0 | 1 | 1 | 1 | 1 | 1 | 0 | 0 | 0 | 0 | 0 | 1 | 1 | 1 | 1 | 1 | 1 |
| bit4 | 1 | 1 | 1 | 1 | 1 | 0 | 0 | 0 | 0 | 0 | 1 | 1 | 1 | 1 | 1 | 1 | 0 | 0 | 0 | 0 | 0 | 1 | 1 | 1 |
| bit5 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 | 1 |
| bit6 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |
| bit7 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

| RIGHT AND LEFT ANGLE DETECTION (RIGHT ROTATIONAL DIRECTION) | | | | | | | | | | | | | | | | | | | | | | | | |
|---|---|---|---|---|---|---|---|---|---|---|---|---|---|---|---|---|---|---|---|---|---|---|---|---|
| STANDARD ANGLE | ◆ | | | | | | ◆ | | ◆ | | ◆ | | | | ◆ | | | | ◆ | | | | | ◆ |
| ROTATIONAL ANGLE | 0 | | 15 | | 30 | | 45 | | 60 | | 75 | | 90 | | 105 | | 120 | | 135 | | 150 | | 165 | | 180 |
| bit1 | 0 | 0 | 0 | 0 | 1 | 1 | 1 | 1 | 1 | 0 | 0 | 0 | 1 | 1 | 1 | 0 | 0 | 0 | 0 | 1 | 1 | 1 | 0 | 0 |
| bit2 | 1 | 1 | 0 | 0 | 0 | 0 | 1 | 1 | 1 | 1 | 1 | 0 | 0 | 0 | 1 | 1 | 1 | 1 | 0 | 0 | 1 | 1 | 1 | 1 |
| bit3 | 1 | 1 | 1 | 0 | 0 | 0 | 0 | 0 | 1 | 1 | 1 | 1 | 1 | 0 | 0 | 0 | 0 | 0 | 1 | 1 | 1 | 1 | 1 | 1 |
| bit4 | 1 | 1 | 1 | 1 | 1 | 0 | 0 | 0 | 0 | 0 | 1 | 1 | 1 | 1 | 1 | 1 | 0 | 0 | 0 | 0 | 0 | 1 | 1 | 1 |
| bit5 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 | 1 |
| bit6 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| bit7 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |

FIG.8B

| DIRECTION DETECTION FOR 180° RIGHT OR LEFT ROTATION | | | |
|---|---|---|---|
| ROTATIONAL DIRECTION | LEFT | INTERMEDIATE | RIGHT |
| bit1 | 1 | 1 | 0 |
| bit2 | 0 | 1 | 1 |

FIG.8C

| UPPER AND LOWER ANGLE DETECTION | | | | | | | | | |
|---|---|---|---|---|---|---|---|---|---|
| STANDARD ANGLE | ◆ | | | | ◆ | ◆ | ◆ | | ◆ |
| ROTATIONAL ANGLE | 0 | 15 | 30 | 45 | 60 | 75 | 90 | 105 | 120 |
| bit1 | 1 | 0 | 0 | 0 | 1 | 1 | 1 | 1 | 0 | 0 | 0 | 1 | 1 | 1 | 0 | 0 |
| bit2 | 1 | 1 | 0 | 0 | 0 | 0 | 1 | 1 | 1 | 1 | 1 | 0 | 0 | 0 | 1 | 1 |
| bit3 | 1 | 1 | 1 | 0 | 0 | 0 | 0 | 0 | 1 | 1 | 1 | 1 | 1 | 0 | 0 | 0 |
| bit4 | 1 | 1 | 1 | 1 | 1 | 0 | 0 | 0 | 0 | 0 | 1 | 1 | 1 | 1 | 1 | 1 |
| bit5 | 1 | 1 | 1 | 1 | 1 | 1 | 1 | 0 | 0 | 0 | 0 | 0 | 0 | 0 | 0 | 1 |

ILLUMINATION DEVICE AND ILLUMINATION CONTROL METHOD

BACKGROUND

1. Field

Aspects of the present invention generally relate to a control for changing a light emitting direction of an illumination device.

2. Description of the Related Art

Conventionally, flash imaging involving the following procedure (hereinafter, referred to as a bounce flash imaging) has been known. Specifically, light is emitted from an illumination device to a ceiling and the like, and an object is illuminated with diffused reflected light from the ceiling and the like. With the bounce flash imaging, the object can be illuminated with the light from the illumination device, not directly but indirectly, whereby the object can be depicted with soft light.

In a flash device discussed in Japanese Patent Application Laid-Open No. 2008-180913, a light emitting unit can be manually rotated and can be stopped at a predetermined angle with a click mechanism. The flash device discussed in Japanese Patent Application Laid-Open No. 2008-180913 further includes a lock mechanism in addition to the click mechanism. The lock mechanism prevents the light emitting unit from rotating beyond the predetermined angle. The light emitting unit of the flash device discussed in Japanese Patent Application Laid-Open No. 2008-180913 includes at least the click mechanism and is rotatable in the right and left direction.

In recent years, flash devices, having what is known as an auto bounce function, as discussed in Japanese Patent Application Laid-Open No. 2011-170014 and Japanese Patent Application Laid-Open No. 2009-75340, have been developed. With the auto bounce function, a light emission direction of the flash device is rotated by a drive mechanism, using a drive source such as a motor, so that the light emitting direction is automatically adjusted.

The flash device discussed in Japanese Patent Application Laid-Open No. 2009-75340 rotates a remote light emitting unit in a casing of a head unit. The flash devices discussed in Japanese Patent Application Laid-Open No. 2011-170014 and Japanese Patent Application Laid-Open No. 2008-180913 rotate a casing (hereinafter, referred to as head unit) accommodating the light emitting unit. To achieve greater user friendliness, the flash devices having the auto bounce function preferably have, in addition to the auto bounce function, a configuration allowing a user to directly hold and manually rotate the head unit.

Generally, the following counter measure is provided for abnormalities such as collision of the drive mechanism against an obstacle, and rotated manually or by the drive mechanism. More specifically, a clutch mechanism such as a slipping clutch is provided in the drive mechanism, including the motor, to protect the drive mechanism. However, the click mechanism and the lock mechanism discussed in Japanese Patent Application Laid-Open No. 2008-180913 might hinder operations of the drive mechanism and thus are preferably not provided.

However, the head unit, stopped at a predetermined angle and held only by the holding force of the clutch mechanism, is likely to have the angle changed upon receiving external force. When the resultant angle is not what is intended by the user, the object is not properly illuminated with the illumination light, and this leads to a failure imaging.

To prevent such a problem, the clutch mechanism needs to have extremely high holding force to sufficiently hold the head unit. Alternatively, the click mechanism and the lock mechanism, which hinder the operation of the drive mechanism, need to be provided. In such cases, the drive mechanism of the head unit needs to be rigid enough to bear the holding force of the clutch mechanism or the resistive force of the click mechanism. A high-output, large-size motor is required to overcome the resistive force of the click mechanism, whereby the size and the cost of the drive mechanism increase. When the lock mechanism is provided, the configuration becomes complicated considering that the locking needs to be released when the drive mechanism operates, whereby the size and the cost of the flash device increase.

SUMMARY

Aspects of the present invention are generally directed to an illumination device and an illumination control method capable of appropriately illuminating an object with illumination light even when a light emitting direction is shifted to a direction unintended by a user by accidental external force.

According to an aspect of the present invention, an illumination device includes a first casing, a second casing including a light emitting unit configured to be rotatable relative to the first casing, a drive unit configured to rotate the second casing relative to the first casing, a detection unit configured to detect rotation of the second casing relative to the first casing, and a control unit configured to select any one of a first mode, in which, when the detection unit detects the rotation of the second casing even when the second casing is not rotated by the drive unit, the control unit causes the drive unit to rotate the second casing to a position of the second casing before the rotation of the second casing is detected by the detection unit, or a second mode, in which, when the detection unit detects the rotation of the second casing even when the second casing is not rotated by the drive unit, the control unit does not cause the drive unit to rotate the second casing to the position of the second casing before the rotation of the second casing is detected by the detection unit.

Further features of the present disclosure will become apparent from the following description of exemplary embodiments with reference to the attached drawings.

BRIEF DESCRIPTION OF THE DRAWINGS

FIGS. 8A, 8B, and 8C are signal transition charts of the bounce angle detection unit.

DESCRIPTION OF THE EMBODIMENTS

Various exemplary embodiments will be described in detail below with reference to the drawings.

Figure 1:
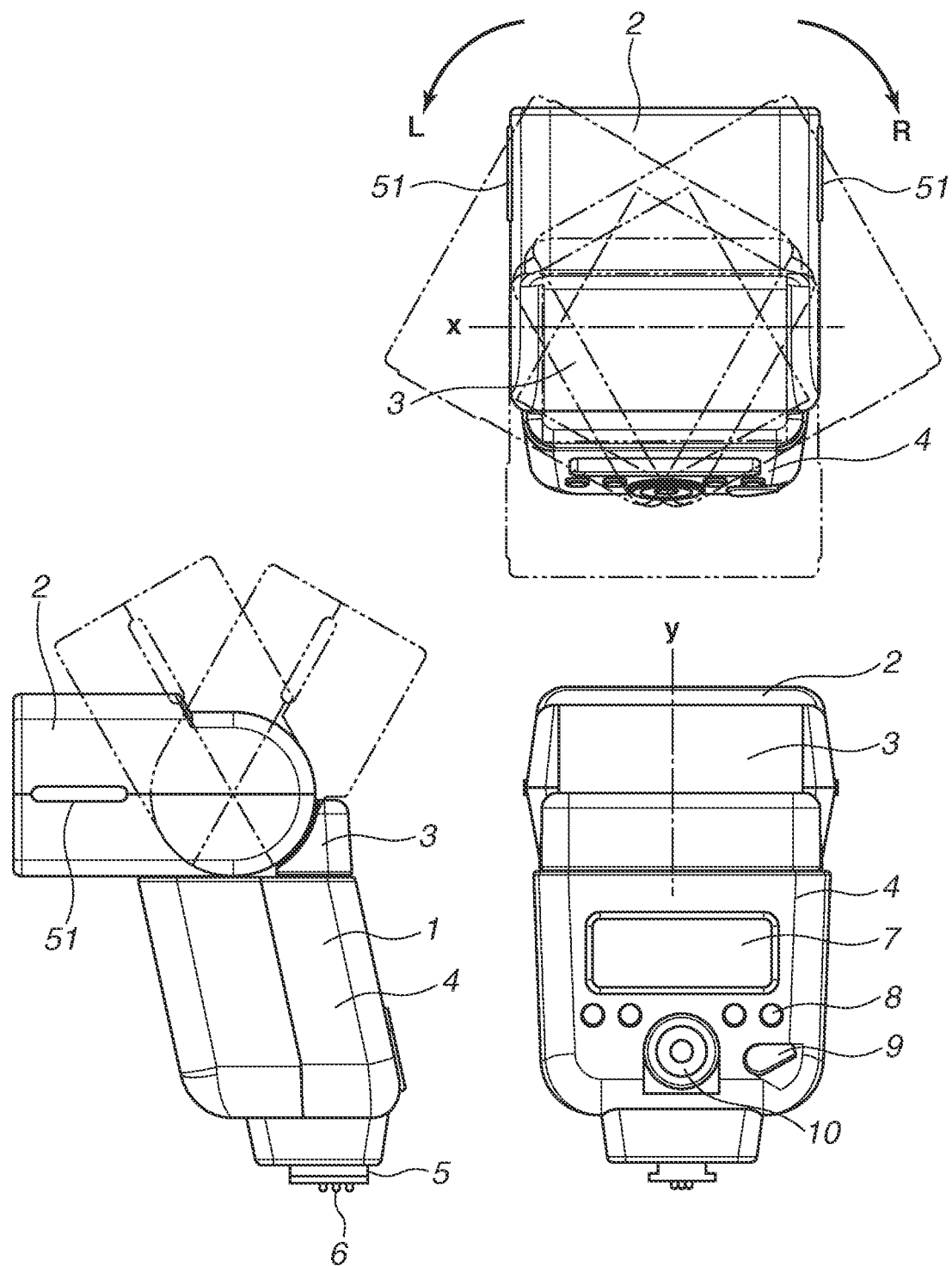
FIG. 1 is three orthographic views of a flash device according to an exemplary embodiment.
Figures 2A, 2B:
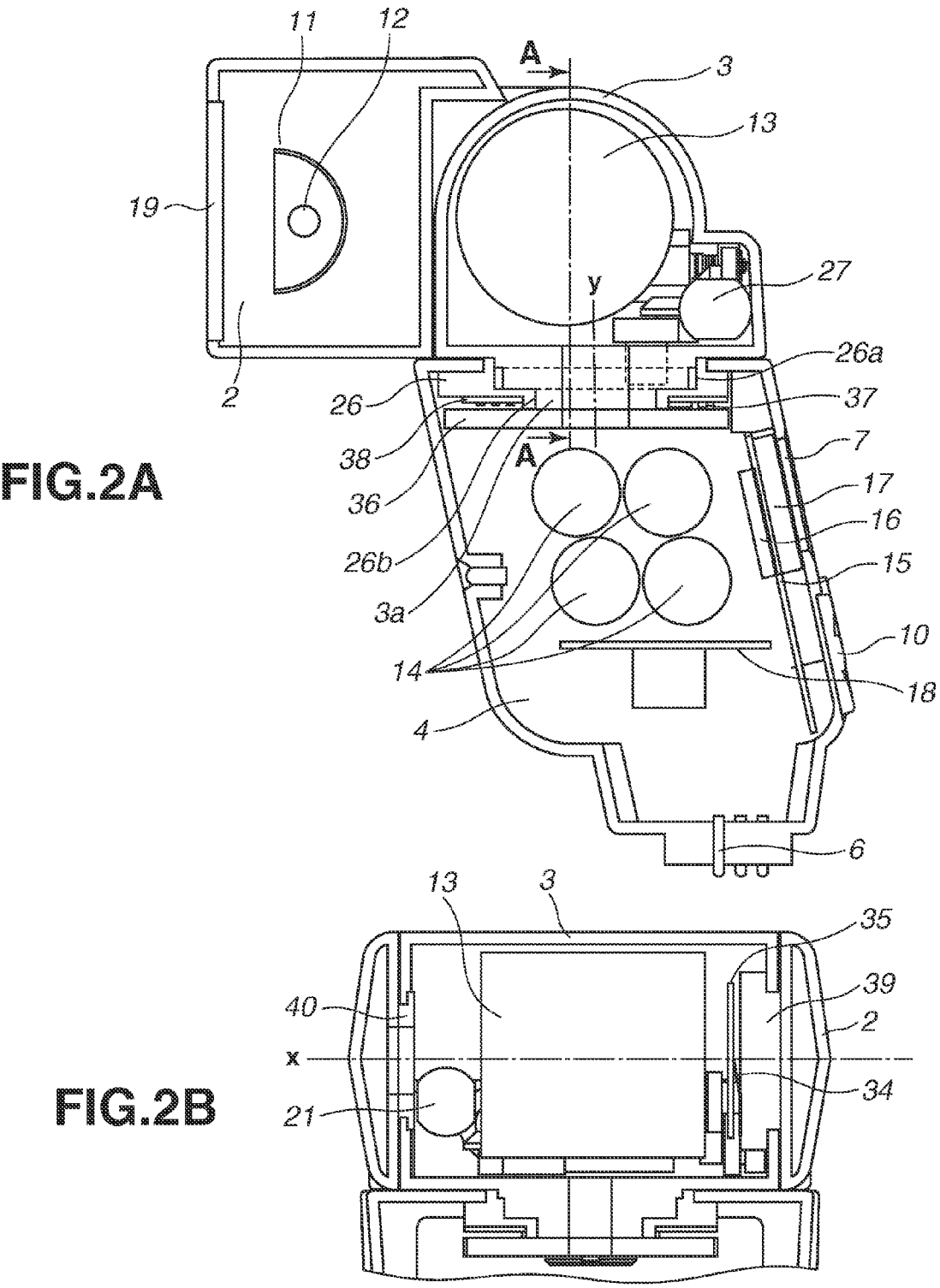
FIGS. 2A and 2B are cross-sectional views of the flash device according to the exemplary embodiment.
Figure 3:
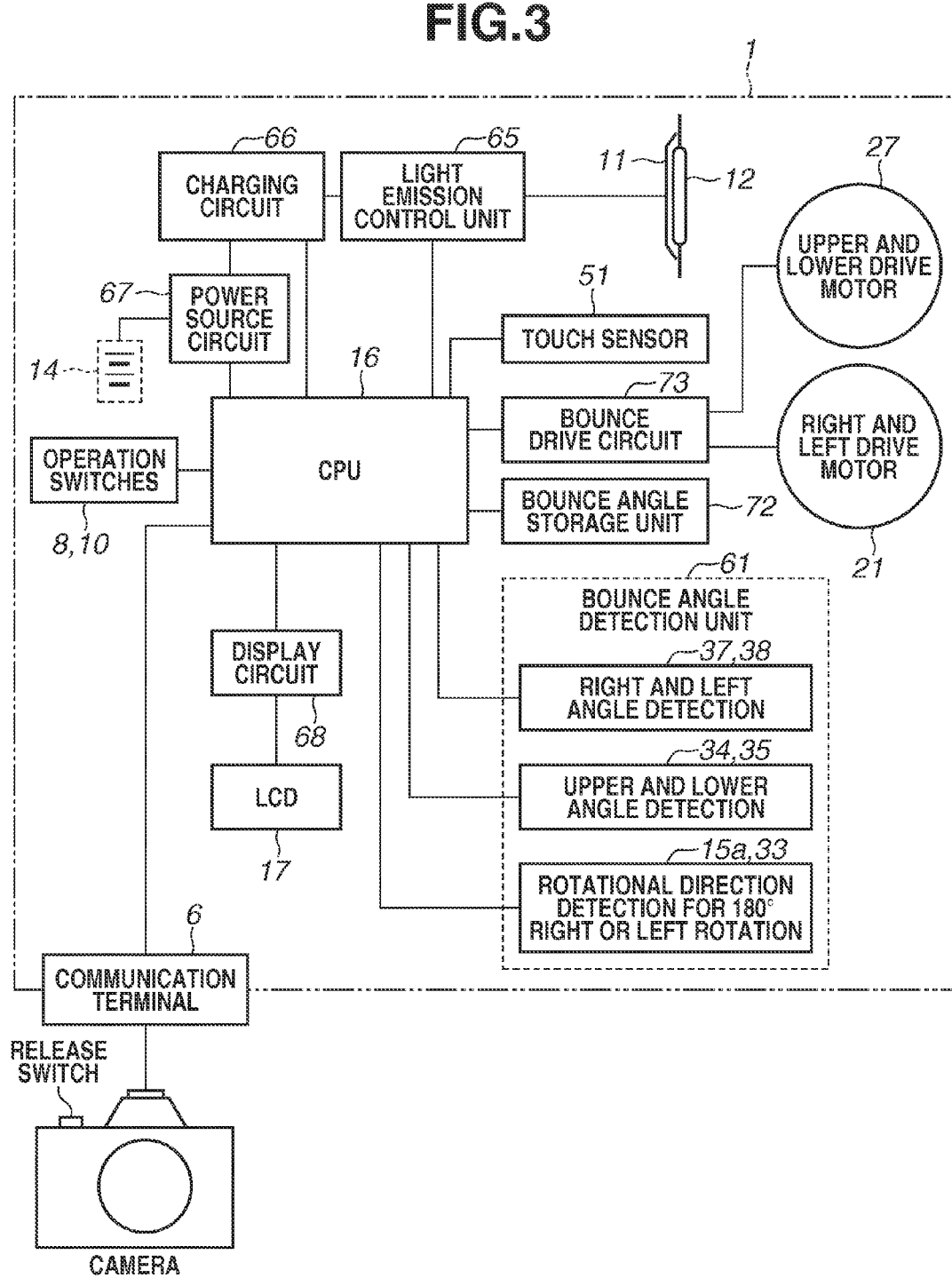
FIG. 3 is a block diagram related to control on the flash device according to the exemplary embodiment.

FIG. 1 is three orthographic views of a flash device 1 as an illumination device according to a first exemplary embodiment. FIG. 2 is a cross-sectional view of the flash device 1, in which FIG. 2A is a center cross-sectional view of the entire flash device, and FIG. 2B is a local cross-sectional view of a bounce unit 3 taken along line A-A in FIG. 2A. FIG. 3 is a block diagram illustrating an internal configuration related to control of the flash device 1.

The flash device 1 includes following three separate casings: a head unit 2 (second casing), the bounce unit 3, and a control unit 4 (first casing). The head unit 2 is rotatable relative to the bounce unit 3 about an axis x. The bounce unit 3 is rotatable relative to the control unit 4 about an axis y, while holding the head unit 2. In the description below, in FIG. 1, a rotational direction of the head unit 2 about the x axis is referred to as an upper and lower direction, and a rotational direction of the head unit 2 about the y axis is referred to as a right and left direction. Regarding the right and left direction, directions of arrows L and R in upper view of the flash device 1 are respectively defined as right and left directions. The head unit 2 is rotatable from a normal position (0° in the upper and lower direction and 0° in the right and left direction) for emitting light in a front direction, illustrated in the solid line in FIG. 1. More specifically, the head unit 2 is rotatable in an upper direction by a maximum of 120°, and in both the right and left directions by a maximum of 180°, as illustrated in the two-dot chain line. Thus, a movable member including the head unit 2 and the bounce unit 3 is held to be rotatable, relative to the control unit 4 as a main body portion, by a predetermined rotational angle in each of the upper and lower direction (first direction) and the right and left direction (second direction). In the description below, an operation of rotating the movable member relative to the main body portion, in the upper and lower direction and the right and left direction, is referred to as a bounce operation. In the description below, a rotational angle of the movable member relative to the main body portion, in the upper and lower direction and the right and left direction, is referred to as a bounce angle. The bounce angle at the normal position is 0° in each of the upper and lower direction and the right and left direction.

The bounce operation can be performed through a rotation caused by a drive mechanism, having a motor as a drive source, described below, and through a rotation caused by external force applied by a user directly holding the head unit 2. The rotation caused by the drive mechanism is used for what is known as an automatic bounce function. With the automatic bounce function, the flash device 1 (or a camera system connected to the flash device 1) selects an appropriate light emitting direction (bounce angle) and automatically rotates the head unit 2 for flash imaging.

The casing of the head unit 2 incorporates a light emitting optical unit including a xenon tube 12, a reflector 11, and a Fresnel lens 19. In many cases, the light emitting optical unit has what is known as a zoom function of changing an illumination range by moving the xenon tube 12 and the reflector 11 relative to the Fresnel lens 19 in an optical axis direction. The zoom function may be achieved by a known configuration, and thus will not be described in detail.

Touch sensors 51 are respectively disposed on both side surfaces of the head unit 2. The touch sensors 51 detect that a user's hand is in contact when the user holds the head unit 2 to manually set the bounce angle. In the present exemplary embodiment, an example where the touch sensors 51 are used as the components for the contact detection is described. Alternatively, mechanical switches may be used as long as the holding by the user can be effectively detected. A detection method by the touch sensors is not particularly limited, and may be a known method such as a resistance film type or a capacitance type. A portion likely to be touched by the user for holding the head unit 2 varies in accordance with the shape of the head unit 2. Thus, the contact detection may not necessarily take place on both side surfaces of the head unit 2. The head unit 2 held by the user is likely to be in contact with the user at a plurality of portions independent from each other. Thus, any configuration may be employed as long as the contact can be detected at a plurality of portions that are likely to come into contact with the user.

The head unit 2 is pivotally supported by the bounce unit 3 through an upper and lower drive end gear 39 and a bearing 40, and thus is rotatable in the upper and lower direction. The upper and lower drive end gear 39 and the bearing 40 are fixed from inside on an x axis as the rotational axis. The casing of the bounce unit 3 accommodates a main capacitor 13. High voltage charges for flashing the xenon tube 12 are accumulated in the main capacitor 13. The casing further accommodates most parts of an upper and lower direction drive mechanism 63 and a right and left direction drive mechanism 62 described below. The upper and lower direction drive mechanism 63 is used for the rotation in the upper and lower direction and has an upper and lower drive motor 27 as the drive source. The right and left direction drive mechanism 62 is used for the rotation in the right and left direction and has a right and left drive motor 21 as the drive source.

The bounce unit 3 is pivotally supported by the control unit 4 in the following manner, to be rotatable in the right and left direction. More specifically, a shaft portion 3a is rotatably supported by a bearing hole 26b formed in a right and left drive end gear 26 fixed in an upper portion of the control unit 4 from inside. The bounce unit 3 is prevented from detaching by a rotation lock plate 36 fixed to a lower surface of the shaft portion 3a.

The casing of the control unit 4 accommodates a main board 15. A central processing unit (CPU) 16, in charge of an operation of the flash device 1, is mounted on the main board 15. The CPU 16 is connected to a display circuit 68 that operates an LCD 17 as a display unit for external display. The CPU 16 is further connected to a bounce angle detection unit 61, a bounce drive circuit 73, and the like described below. A bounce angle storage unit 72 stores angle information of the head unit 2 obtained by the bounce angle detection unit 61, as appropriate. The bounce angle storage unit 72 uses a storage device such as an erasable programmable read only memory (EPROM) included in the CPU 16 or disposed outside. The control unit 4 is provided with, on a rear surface, an LCD window 7 for viewing the LCD 17 for external display, as well as operation switches such as operation buttons 8 and a dial 10 for performing various settings on the flash device 1. A plurality of communication terminals 6 for communicating with a camera is disposed on a leg portion 5 on a lower surface of the control unit 4. A sub board 18 is disposed below a plurality of batteries 14 mounted in the flash device 1. A power source circuit 67 and a charging circuit 66 are partially mounted on the sub board 18. Generally, a light emission control circuit 65, in the block diagram in FIG. 3, is dispersedly disposed on the sub board 18, a board (not illustrated) in the light emitting unit, and the like.

One of the operation buttons 8 described above is used for activating and deactivating an automatic bounce function of the flash device 1 having the automatic bounce function.

Figure 9A:
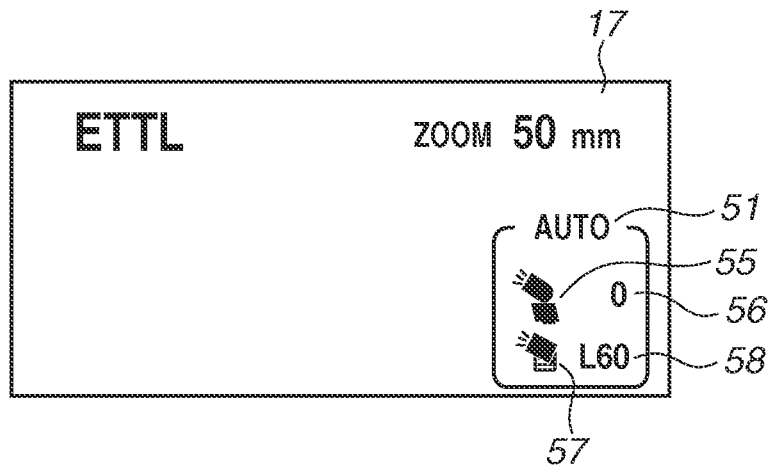
FIGS. 9A, 9B, and 9C illustrate displays on a liquid crystal display (LCD) of the flash device according to the exemplary embodiment.
Figure 9B:
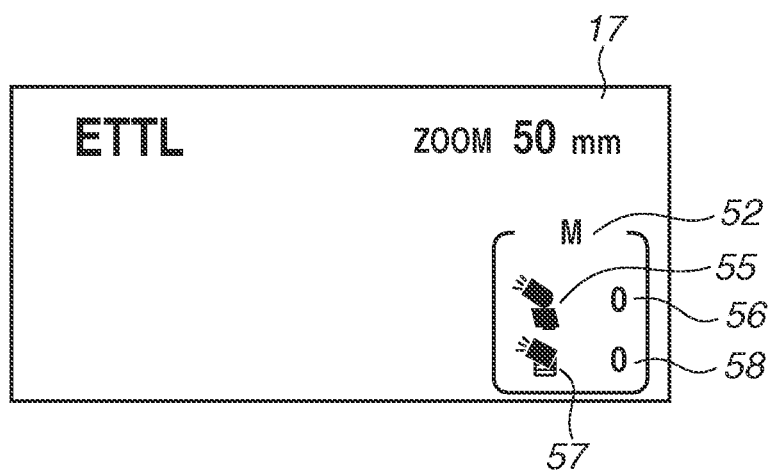

FIG. 9 illustrates a display state of the LCD 17. The display switches between an automatic bounce mode illustrated in FIG. 9A and a manual bounce mode illustrated in FIG. 9B, each time the above-described operation button 8 is pressed. The user can recognize that the auto bounce function of the flash device 1 is activated with an index 51, written "AUTO", displayed on a lower right portion of the LCD 17 as illustrated in FIG. 9A. In the auto bounce mode, the flash device (or a camera system including the flash device) selects a light emitting direction suitable for the flash imaging, and the right and left direction drive mechanism 62 and the upper and lower direction drive mechanism 63 automatically rotate the head unit 2. The method of selecting the light emitting direction for the auto bounce mode is not particularly limited and includes a method of selecting the light emitting direction based on the acquired distances to the object and to a reflector member, and a method of selecting the light emitting direction based on a plurality of photometry results obtained by emitting light for a plurality of times in different light emitting directions.

An index 52 of "M", in addition to the display illustrated in FIG. 9A, displayed on the lower right portion of the LCD 17 as illustrated in FIG. 9B indicates that the auto bounce function of the flash device 1 is deactivated, and the flash device 1 is in the manual bounce mode. The manual bounce mode allows a user to set the light emitting direction as desired, and thus the same state as the conventional flash device without the auto bounce function is achieved. It is a matter of course that, in the manual bounce mode, a direct operation of the user is required for rotating the head unit 2. More specifically, the user has to hold and rotate the head unit 2.

Indexes 55 to 58 displayed on the LCD 17 indicate the current bounce angle stored in the bounce angle storage unit 72. The index 55 is an icon indicating the upper and lower direction. The index 56 is an icon indicating the rotational angle in the upper and lower direction. The index 57 is an icon indicating the right and left direction. The index 58 is an icon indicating the rotational angle in the right and left direction. The rotation can be caused by the right and left direction drive mechanism 62 and upper and lower direction drive mechanism 63 with the rotational angles on display changed through a predetermined operation using the other operation buttons 8, the dial 10, and the like.

Figure 4:
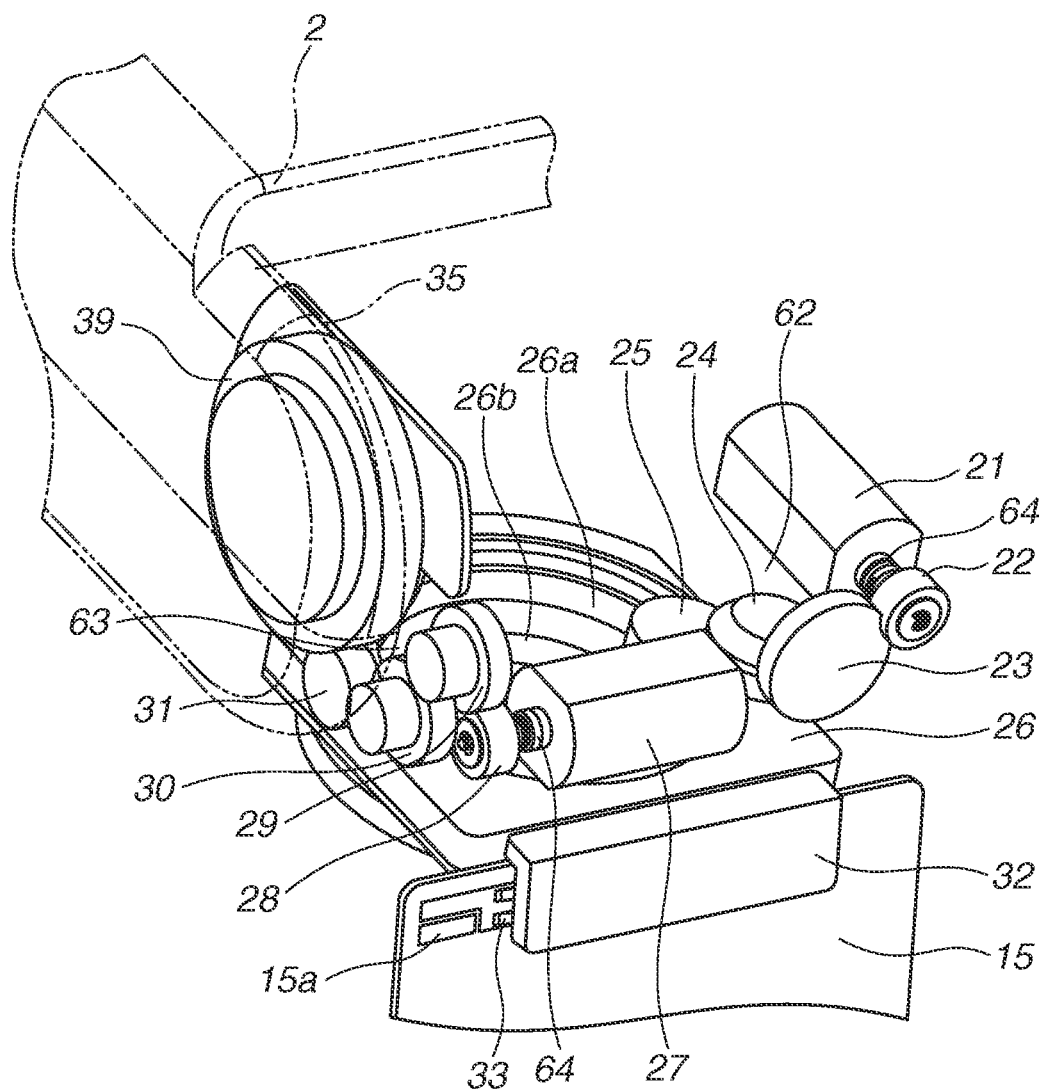
FIG. 4 is a perspective view of a head unit drive mechanism according to the exemplary embodiment.
Figure 5A:
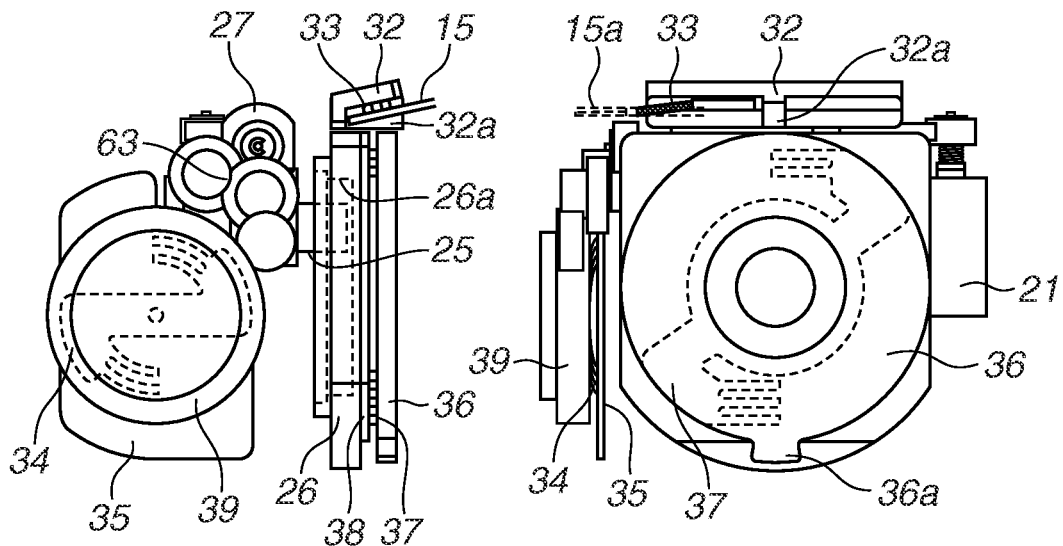
FIGS. 5A, 5B, and 5C are plan views of the head unit drive mechanism according to the exemplary embodiment.
Figure 5B:
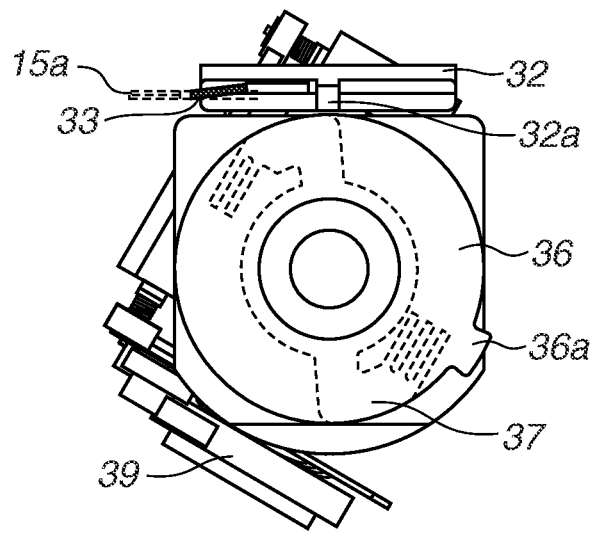
Figure 5C:
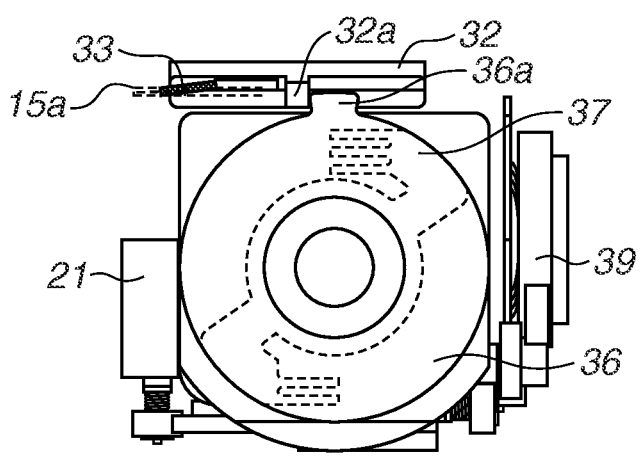

Next, the configurations of the right and left direction drive mechanism 62 and the upper and lower direction drive mechanism 63 will be described. FIG. 4 is a perspective view of the right and left direction drive mechanism 62 and the upper and lower direction drive mechanism 63 each being disposed in both the casing of the bounce unit 3 and the upper portion of the control unit 4. FIGS. 5A, 5B, and 5C are plan views of the right and left direction drive mechanism 62 and the upper and lower direction drive mechanism 63. FIG. 5A illustrates the right and left direction drive mechanism 62 and the upper and lower direction drive mechanism 63 in a state where the head unit 2 is at the normal position (0°), as viewed from the lower side of the control unit 4 (right figure) and the left side (left figure). FIG. 5B illustrates the right and left direction drive mechanism 62 and the upper and lower direction drive mechanism 63 in a state where the head unit 2 has been rotated by 60° in the right direction, as viewed from the lower side of the control unit 4. FIG. 5C illustrates the right and left direction drive mechanism 62 and the upper and lower direction drive mechanism 63 in a state where the head unit 2 has been rotated by 180° in the right direction, as viewed from the lower side of the control unit 4.

The right and left drive motor 21 and the upper and lower drive motor 27, used as drive sources of the right and left direction drive mechanism 62 and the upper and lower direction drive mechanism 63, respectively, are each a direct current (DC) motor, and are controlled by the bounce drive circuit 73 including a general motor driver. The right and left drive motor 21 and the upper and lower drive motor 27 are respectively provided with first stage gears 22 and 28 each including a clutch mechanism 64 described below. Transmission gears 29, 30, and 31 transmit driving force from the first stage gear 28 of the upper and lower drive motor 27 to the upper and lower drive end gear 39, at an appropriate reduction ratio. The driving force transmitted through the transmission gears 29, 30, and 31 rotates the upper and lower drive end gear 39, and thus the head unit 2, directly connected to the upper and lower drive end gear 39, rotates in the upper and lower direction. The upper and lower drive end gear 39 is provided with a contact brush 34 on a surface facing the inner side of the bounce unit 3. The contact brush 34 comes into contact with and rotates relative to an upper and lower angle detection board 35 held in the casing of the bounce unit 3. Thus, the contact brush 34 serves as the bounce angle detection unit 61 to detect an angle in the upper and lower direction.

Transmission gears 23, 24, and 25 transmit driving force from the first stage gear 22 of the right and left drive motor 21 to an annulus gear 26a formed on an inner circumference of the right and left drive end gear 26, at an appropriate reduction ratio. A bevel gear is used between the transmission gears 23 and 24 to shift the rotational axis direction of the transmission gears by 90°. The right and left end drive gear 26 is fixed on the side of the control unit 4, and thus when the right and left end drive gear 26 receives the driving force from the transmission gear 25 as a result of the rotation of the motor 21, a side of the bounce unit 3 (i.e., the head unit 2) rotates relative to the control unit 4, in the right and left direction. A contact brush 37 is attached to the rotation lock plate 36 fixed on a lower surface of the bounce unit 3. The contact brush 37 comes into contact with and rotates relative to a right and left angle detection board 38 attached to the lower surface of the right and left end drive gear 26. Thus, the contact brush 37 serves as the bounce angle detection unit 61 to detect an angle in the right and left direction.

A right and left rotation stopper 32 disposed above the main board 15 is held in the control unit 4 and can swing in the right and left direction by a predetermined amount. In a normal state, a spring mechanism and the like (not illustrated) keeps the right and left rotation stopper 32 stationary at the center as illustrated in FIGS. 5A and 5B. When the head unit 2 is rotated in the right and left direction, a locking protrusion 36a, formed on an outer circumference of the rotation lock plate 36, comes into contact with a rib 32a of the right and left rotation stopper 32, right before the head unit 2 is rotated by 180°. Thus, the right and left rotation stopper 32 swings. As illustrated in FIG. 5C, when the head unit 2 is rotated in the right direction by 180°, the right and left rotation stopper 32 moves toward the left in FIG. 5C. Then, the right and left rotation stopper 32, which can only move by a limited amount, stops, and thus the head unit 2 is prevented from rotating over 180°. A contact brush 33, fixed to the right and left rotation stopper 32, comes into contact with and rotates relative to a pattern 15a on the main board 15. Thus, the contact brush 33 serves as the bounce angle detection unit 61 to detect the rotational direction when the head unit 2 is rotated by 180°.

Figure 6:
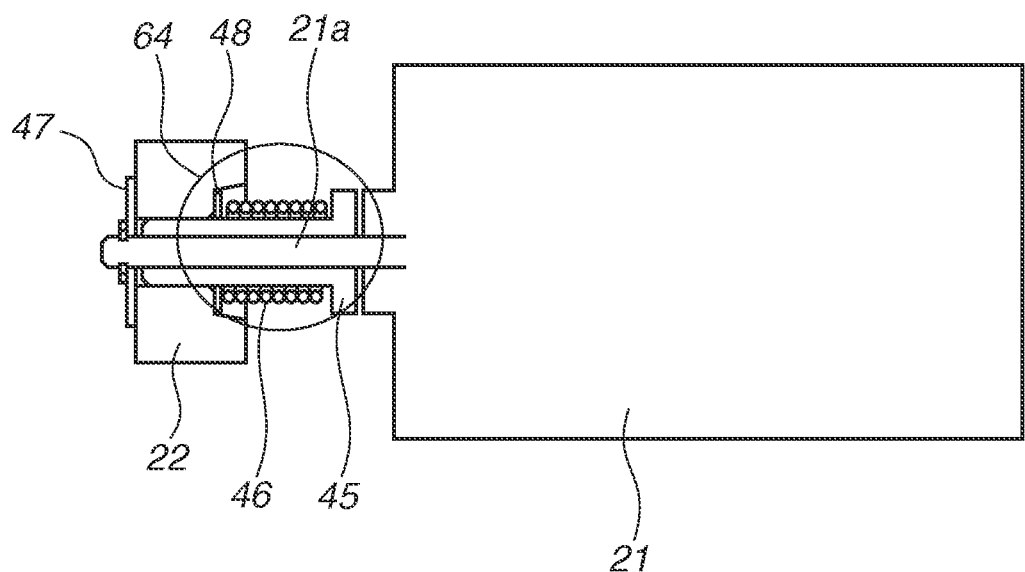
FIG. 6 is a cross-sectional view illustrating a clutch mechanism of the head unit drive mechanism according to the exemplary embodiment.

The clutch mechanism 64 will be described in detail. FIG. 6 is a cross-sectional view illustrating the clutch mechanism 64 of the first stage gears 22 and 28, respectively attached to the right and left drive motor 21 and the upper and lower drive motor 27. The configuration of the clutch mechanism 64 is the same between the first stage gears 22 and 28, and thus only the first stage gear 22 will be described below, and the first stage gear 28 will not be described. The clutch mechanism 64 includes a pulley 45 fixedly adhering to a rotational shaft 21a of the right and left drive motor 21, a first gear 22 rotatably supported by the pulley 45, a friction spring 46, a friction washer 48, and a washer 47 that prevents the first stage gear 22 from detaching. The rotational force from the pulley 45 is transmitted to the first stage gear 22 by frictional force as a result of biasing force from the friction spring 46. The clutch mechanism 64 is provided to the right and left direction drive mechanism 62 and the upper and lower direction drive mechanism 63, so that an excessive amount of load will not be imposed on the motor and the gear train when the head unit 2, rotated manually by the user or automatically, collides with an obstacle. In a state where the power source of the flash device 1 is ON, the right and left drive motor 21 and the upper and lower drive motor 27 are controlled to be in what is known as a braking state, with input terminals of the right and left drive motor 21 and the upper and lower drive motor 27 short circuited by the bounce drive circuit 73. Thus, the head unit 2 is not easily rotated by the external force. The coupling force of the clutch mechanism 64 is set to such a level that slipping occurs when the head unit 2 is rotated by the external force while the right and left drive motor 21 and the upper and lower drive motor 27 are in the braking state. The coupling force is set to be strong enough to prevent the head unit 2 from rotating with the own weight, but not too strong to hinder the rotation of the head unit 2 directly held and rotated by the user. The clutch mechanism 64 as a general slipping clutch mechanism, which is provided to each of the first stage gears 22 and 28 attached to the motor shaft in the present exemplary embodiment, may be provided at other portions in the transmission gear train. The clutch mechanism 64 is not limited to the slipping clutch mechanism, and may be a clutch mechanism utilizing the engagement between latches, or the like.

Figure 7A:
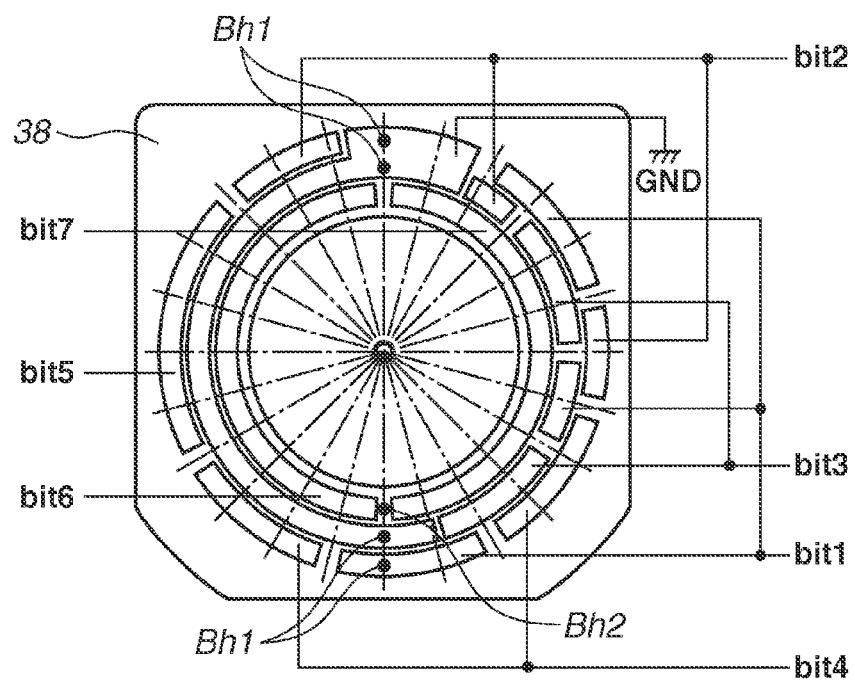
FIGS. 7A, 7B, and 7C are plan views illustrating patterns of boards used as a bounce angle detection unit.
Figure 7B:
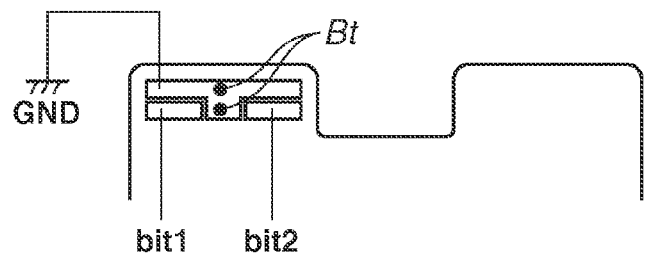
Figure 7C:
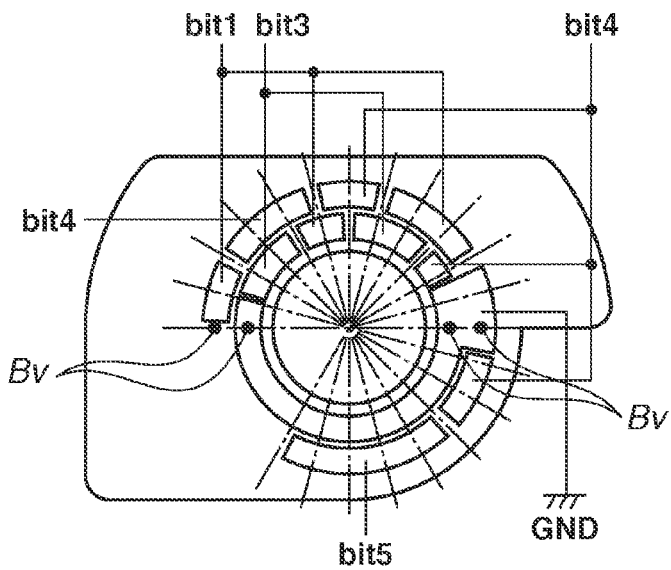

Next, the bounce angle detection unit 61 will be described in detail referring to FIGS. 7A to 7C and 8A to 8C. FIGS. 7A to 7C are plan views illustrating patterns of the boards used for detecting the bounce angle. FIG. 7A illustrates a pattern on the right and left angle detection board 38, FIG. 7B illustrates a pattern 15a on the main board 15, and FIG. 7C illustrates a pattern on the upper and lower angle detection board 35. FIG. 8A to 8C are signal transition charts illustrating how signals switch in accordance with the bounce angle of the head unit 2, in the bounce angle detection. FIG. 8A illustrates right and left angle detection performed by the right and left angle detection board 38. FIG. 8B illustrates rotational direction detection for the head unit 2 rotated by 180° in the right and left direction, performed by the pattern 15a on the main board 15. FIG. 8C illustrates upper and lower angle detection performed by the upper and lower angle detection board 35.

First of all, a case where the head unit 2 rotates in the right and left direction will be described. Signal patterns of the bits 1 to 7, connected to the CPU 15, are disposed, on the right and left angle detection board 38, in three rows along the circumference direction. The patterns of the bits 1 to 5 are separately disposed over the entire 360° circumference in two outer rows. A ground (GND) pattern occupies half the circumference in the center row. The patterns of the bits 6 and 7 are respectively disposed in approximately half circumference ranges opposite to each other in the innermost row.

Contact points Bh1 and Bh2 of the contact brush fixed to the rotation lock plate 36, illustrated as black points, indicate that the head unit 2 is at the normal position. The contact points Bh1 at four positions of the contact brush 37 can come into contact with the patterns in the outer two rows of the right and left angle detection board 38, and are disposed to be symmetrical about the rotational axis. The contact point Bh2 is disposed only on one side of the contact brush 37, and can come into contact with the patterns in the innermost row of the right and left angle detection board 38. In FIG. 7A, the contact points Bh1 and Bh2 rotate in the left direction when the head unit 2 rotates in the right direction, and rotates in the right direction when the head unit 2 rotates in the left direction.

The signal of each of the bits 1 to 7 is connected to the CPU 16 while being electrically pulled up, and thus is at High voltage (1) when the corresponding one of patterns of the bits 1 to 7 is not in contact with the contact brush 37. The signal switches to GND level (0) when the corresponding one of the patterns of the bits 1 to 7 comes into contact with the contact brush 37, which is constantly in contact with the GND pattern. In the patterns in the two outer rows of the right and left angle detection board 38, maximum of three of the signals of the bit 1 to bit 5 can be set to the GND level (0) at the same time, at three contact points excluding the contact points to the GND pattern.

As illustrated in the signal transition chart in FIG. 8A, the right and left direction angle detection can detect the rotational angle in increments of 15° and can further detect that the head unit 2 is at an intermediate angle therebetween. With the right and left direction angle detection, what is known as a gray code is output, in which each angular change changes a signal of one of the bits. Because the contact points Bh1 of the contact brush 37 are symmetrically disposed about the rotational shaft, the same combination of the signals of the bits 1 to 5 are detected every 180° in a range of rotation in 360°. Whether the head unit 2 has rotated in the right or the left direction is determined with the bits 6 and 7 at the innermost row. The bit 6 is set to 0 when the head unit 2 rotates in the left direction, and the bit 7 is set to 0 when the head unit 2 rotates in the right direction.

In this respect, the combination of the signals is the same between 0° and 180°, and thus the 0° and 180° cannot be distinguished from each other. Furthermore, when the head unit 2 is at 180°, the direction of rotation that has brought the head unit 2 to 180° cannot be identified. Thus, the switching of contact state between the contact brush 33 and the pattern 15a on the main board 15, caused by the swinging of the right and left rotation stopper 32, is used. For example, when the head unit 2 rotates in the right direction to the position of 180° as described above, the contact points of the contact brush 33 at the positions indicated by black points Bt in FIG. 7B in a normal state move toward the left together with the right and left rotation stopper 32. Thus, the pattern of the bit 1 is connected to the GND pattern, so that the signal of the bit 1 is set to the GND level (0), whereby the head unit 2 is determined to be at the 180° position in the right rotational direction. When the head unit 2 is rotated in the left direction to be positioned at the 180° position, the right and left rotation stopper 32 swings toward the right, so that the signal of the bit 2 on the main board 15 is set to the GND level (0), whereby the head unit 2 is determined to be at the 180° position in the left rotational direction.

Next, a case where the head unit 2 rotates in the upper and lower direction will be described.

As illustrated in the plan view of FIG. 7C and the signal transition chart of FIG. 8C, the pattern on the upper and lower angle detection board 35 is arranged to transmit the signal in response to the angle change of the head unit 2, in substantially the same manner as the right and left detection board 38. The pattern on the upper and lower angle detection board 35 also detects the rotational angle in increment of 15° and that the head unit 2 is at the intermediate angle of the rotational angles, and outputs what is known as the gray code, in which each angular change changes a signal of one of the bits. Still, there is a difference in that while the signal patterns of the bits 1 to 5 arranged on the two rows are used, the patterns of the bits 6 and 7, in the right and left angle detection board 38, are not used because the head unit 2 rotates in the upper and lower direction by a maximum of 120° on one side from the normal position. Furthermore, since the signals of the bits 6 and 7 are not used, the set angle of the pattern of the bit 1 is changed in such a manner that the signal of the bit 1 is set to be at High voltage (1) in the normal position)(0°).

Contact points By of the contact brush 34 fixed to the upper and lower drive end gear 39, illustrated as black points, indicate that the head unit 2 is at the normal position. The contact points By at four positions of the contact brush 34, can come into contact with the patterns in the two rows in the upper and lower angle detection board 35, and are symmetrically disposed about the rotation axis. When the head unit 2 rotates in the upper direction, the contact points By in FIG. 7C rotate in the right direction.

As described above, the head unit 2 stopped at predetermined angles by the right and left direction drive mechanism 62 and the upper and lower direction drive mechanism 63 is held only with the coupling force of the clutch mechanism 64. Thus, the angle of the head unit 2 might be changed by accidental collision and the like. When the resultant angle of the head unit 2 is not what is intended by the user, the object is not appropriately illuminated with the illumination light, and this leads to a failure picture.

The clutch mechanism 64 needs to have extremely high coupling force sufficiently hold the head unit 2. As a result, the right and left direction drive mechanism 62 and the upper and lower direction drive mechanism 63 need to be rigid enough to bear the coupling force of the clutch mechanism 64. Thus, the sizes of the right and left direction drive mechanism 62 and the upper and lower direction drive mechanism 63 might be large. A method of detecting the angle change of the head unit 2 and automatically restoring the original angle may be employed, but the automatic angle restoration is preferably not performed when the head unit 2 is manually rotated as the user intended. Thus, a method for determining whether the user has manually rotated the head unit 2 or the angle has been changed by accidental external force, in the present exemplary embodiment, will be described below.

Figure 10:
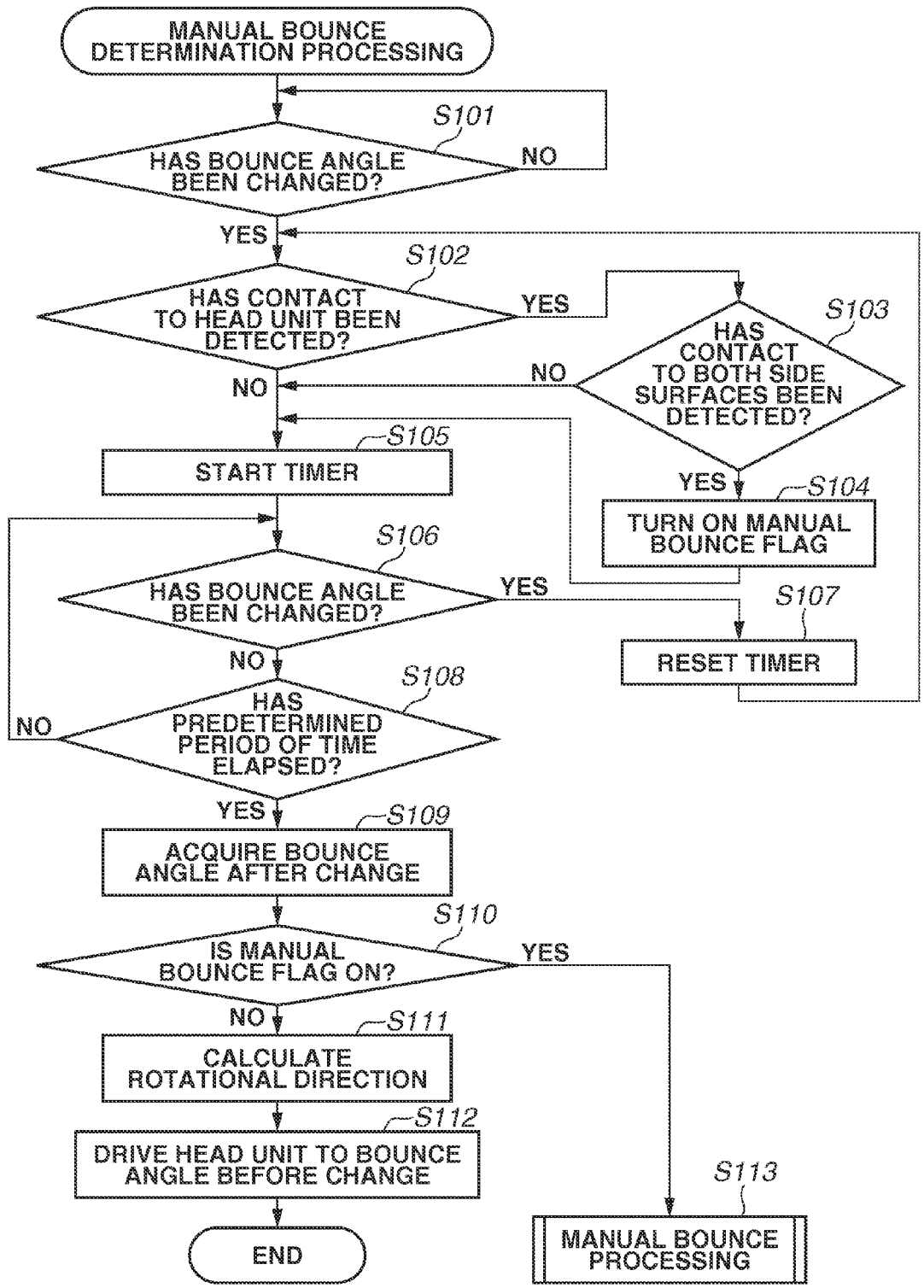
FIG. 10 is a flowchart illustrating manual bounce determination processing according to a first exemplary embodiment.
Figure 11:
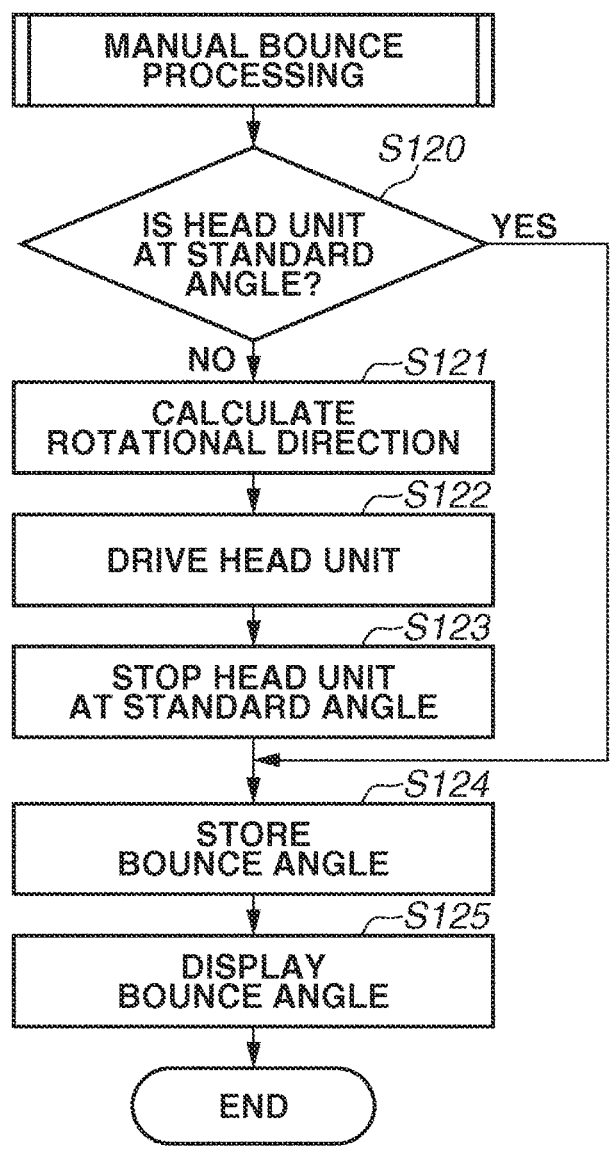
FIG. 11 is a flowchart illustrating manual bounce processing according to the first exemplary embodiment.

FIGS. 10 and 11 are flowcharts of manual bounce determination processing and manual bounce processing, respectively. The changed direction of the head unit 2, either in the upper and lower direction or the right and left direction, does not make a significant difference in the processing content in manual bounce determination processing described below. Thus, the cases where the changed direction is in the upper and lower direction and in the right and left direction, are not distinguished from each other in the description below.

In step S101 in FIG. 10, which is a routine for detecting a change in an angle of the head unit 2, the CPU constantly monitors the change in a signal from the bounce angle detection unit 61.

When any one of the signals from the bounce angle detection unit 61 is switched by the rotation of the head unit 2 caused by the external force (YES in step S101), the processing proceeds to step S102. In step S102, the CPU 16 determines whether any one of the touch sensors 51, disposed on both side surfaces of the head unit 2, has detected the contact. When any one of the touch sensors 51 has detected the contact (YES in step S102), the processing proceeds to step S103. In step S103, the CPU 16 determines whether both of the touch sensors 51, disposed on both side surfaces, have detected the contact. This is because the user generally clamps both side surfaces of the head unit 2 to hold and manually rotate the head unit 2. When both of the touch sensors 51 detect the contact (YES in step S103), the processing proceeds to step S104. In step S104, the CPU 16 turns ON a flag indicating that the manual bounce operation is set, and the processing proceeds to step S105. When the CPU 16 determines that the contact has been detected on only one surface in step S103 (NO in step S103), the CPU 16 determines that the contact is not for the manual operation by the user, but is the contact of some other objects, and the processing proceeds to step S105.

In step S105, the CPU 16 starts a timer. Then, in step S106, the CPU 16 waits for the bounce angle to change, and thus again determines whether the head unit 2 has been rotated by the external force. When the bounce angle changes (YES in step S106), the processing proceeds to step S107. In step S107, the CPU 16 resets the timer, and the processing returns to step S102. Thus, the CPU 16 again determines whether any one of the touch sensors 51, disposed on both side surfaces of the head unit 2, has detected the contact. While the CPU 16 detects no change in the bounce angle in step S106 (NO in step S106), the processing proceeds to step S108 at predetermined intervals. In step S108, the CPU 16 determines whether a predetermined period of time has elapsed based on the timer. When the predetermined period of time has not elapsed yet (NO in step S108), the processing returns to step S106, and thus the CPU 16 again waits for the bounce angle to change. When the timer indicates that the predetermined period of time has elapsed in step S108 (YES in step S108), the CPU 16 determines that the rotation of the head unit 2, caused by the external force, is completed, and the processing proceeds to step S109. In step S109, the CPU 16 acquires the bounce angle after the change from the bounce angle detection unit 61.

In step S110, the CPU 16 determines whether the manual bounce flag is ON. When the flag is ON (YES in step S110), the CPU 16 determines that the user has set the bounce angle as desired, and the processing proceeds to step S113, and thus proceeds to a flow of the manual bounce processing. When the manual bounce flag is OFF (NO in step S110), the CPU 16 determines that the head unit 2 has been rotated by the accidental external force, and the processing proceeds to step S111. In other words, in step S110, the CPU 16 selects between a first mode and a second mode. When the first mode is selected, the processing in step S111 and step S112 is performed. When the second mode is selected, the processing in step S113 and after is performed.

In step S111, the CPU 16 calculates the direction of the rotation of the head unit 2 caused by the external force. The direction of the rotation is calculated from the difference between the bounce angle of the head unit 2 before the angle change, stored in the bounce angle storage unit 72, and the bounce angle of the head unit 2 after the angle change, acquired in step S110. Then, the processing proceeds to step S112. In step S112, the CPU 16 forces the head unit 2 to return to the bounce angle before the angle change is detected (before the rotation), stored in the bounce angle storage unit 72, in accordance with the rotational direction thus calculated. Here, the CPU 16 uses at least one of the right and left direction drive mechanism 62 and upper and lower direction drive mechanism 63. When both the right and left direction and the upper and lower direction are detected as the rotational direction in step S111, the rotation in the right and left direction and the rotation in the upper and lower direction may be performed sequentially or simultaneously.

When the processing proceeds to the manual bounce processing in step S113 as a result of the determination in step S110, in step S120, the CPU 16 determines whether the bounce angle of the currently stopped head unit 2 is a standard angle as illustrated in FIG. 11. The standard angle is an angle provided with a diamond mark in the signal transition chart in FIG. 8, and corresponds to angles in the conventional flash device, in which the head unit 2 is locked by the click mechanism. The standard angles illustrated in FIG. 8 are merely examples, and may not include all the standard angles in FIG. 8 as long as the angle corresponding to the normal position is included, or may include a standard angle not illustrated in FIG. 8. Still, there is no point in setting all the angles as the standard angles, and the standard angles may be a part of angles, to which the head unit 2 can be driven by the right and left drive motor 21 and the upper and lower drive motor 27, including the angle corresponding to the normal position.

When the CPU 16 determines that the head unit 2 is stopped at the standard angle in step S120 (YES in step S120), the processing proceeds to step S124. When the CPU 16 determines that the head unit 2 is not stopped at the standard angle in step S120 (NO in step S120), the processing proceeds to step S121. In step S121, the CPU 16 calculates the rotational direction of the head unit 2 caused by the external force. The direction is calculated from the difference between the bounce angle of the head unit 2 before the angle change, stored in the bounce angle storage unit 72, and the bounce angle of the head unit 2 after the angle change (after the rotation) acquired in step S110. In step S122, the CPU 16 rotates the head unit in the rotational direction thus calculated, with the right and left direction drive mechanism 62 and/or the upper and lower direction drive mechanism 63. In step S123, the CPU 16 stops the rotation of the head unit 2, when the bounce angle of the head unit 2 reaches the closest one of the standard angles. In the next step S124, the CPU 16 stores the bounce angle of the currently stopped head unit in the bounce angle storage unit 72 in an overwriting manner. In step S125, the CPU 16 displays the current bounce angle on the LCD 17.

The rotation control on the head unit 2 in steps S120 to S123 is for assisting the operation of the user. For example, a case is considered where the user attempts to manually rotate the head unit 2 at the normal position to a 60° position in the upper direction or the right and left direction. Here, the head unit 2 is automatically rotated to the 60° position at the standard angle, once the user rotates the head unit 2 by a certain angle smaller than 60°. When making the head unit 2, not at the normal position, return to the normal position, the user can release his or her hand once the angle of the head unit 2 drops below 60°, and the head unit 2 automatically rotates back to the normal position (0°) at the standard angle.

The standard angles illustrated in FIGS. 8A, 8B, and 8C include no angles between 0° and 60°. This is because with a bounce angle smaller than 60° in either the upper and lower direction or the right and left direction, the object might be directly illuminated with light, and thus the effect of the bounce flash imaging might be small.

A method for controlling the right and left drive motor 21 that rotates the head unit 2 in the right and left direction will be described referring to FIGS. 14A and 14B.

In the bounce flash imaging, an error of several degrees in the bounce angle does not significantly change the diffused reflected light to the object. Still, higher accuracy is required for stopping the head unit 2 at the normal position than at a rotated position, so that the object is appropriately illuminated with the illumination light when the head unit 2 is at the normal position. Generally, an illumination range illuminated with the illumination light is adjusted, by an auto zoom mechanism in the light emitting optical unit, to be suitable for a focal length of a lens of the camera. In many cases, the illumination range is set with the amount of light at a peripheral portion being the lowest allowable value, to improve the guide number. Therefore, when the head unit 2 is displaced from the normal position, the peripheral portion with the low light amount leans against the object, making a phenomenon known as uneven light distribution more eminent. In the flash device 1 according to the present exemplary embodiment, the head unit 2 can be stopped in the upper and lower direction by a physical stopper so as not to rotate further in the lower direction from the 0° position as the normal position. However, a physical stopper cannot be provided for stopping the rotation in the right and left direction at the 0° position as the normal position. All things considered, the motor needs to be more accurately controlled to stop the head unit 2 rotating in the right and left direction at the 0° position as the normal position.

In the present exemplary embodiment, at the time when the head unit 2 is rotated, a method for controlling the right and left drive motor 21 is changed in accordance with the rotated amount (angle change amount). FIGS. 14A and 14B illustrate a difference in the way the motor is controlled, for returning the head unit 2, rotated by different angles in the right and left direction, to the normal position (0°). In the graph in FIG. 14A, the horizontal and vertical axes respectively represent the bounce angle of the head unit 2 and the rotational speed (driving speed) of the head unit 2. FIG. 14B illustrates a relationship between rotational phases to be in contract with the contact brush 37 on the right and left angle detection board 38 and angles for switching the motor control illustrated in FIG. 14A. The directions pointed by the arrows indicate the orientation of the head unit 2.

Figure 14A:
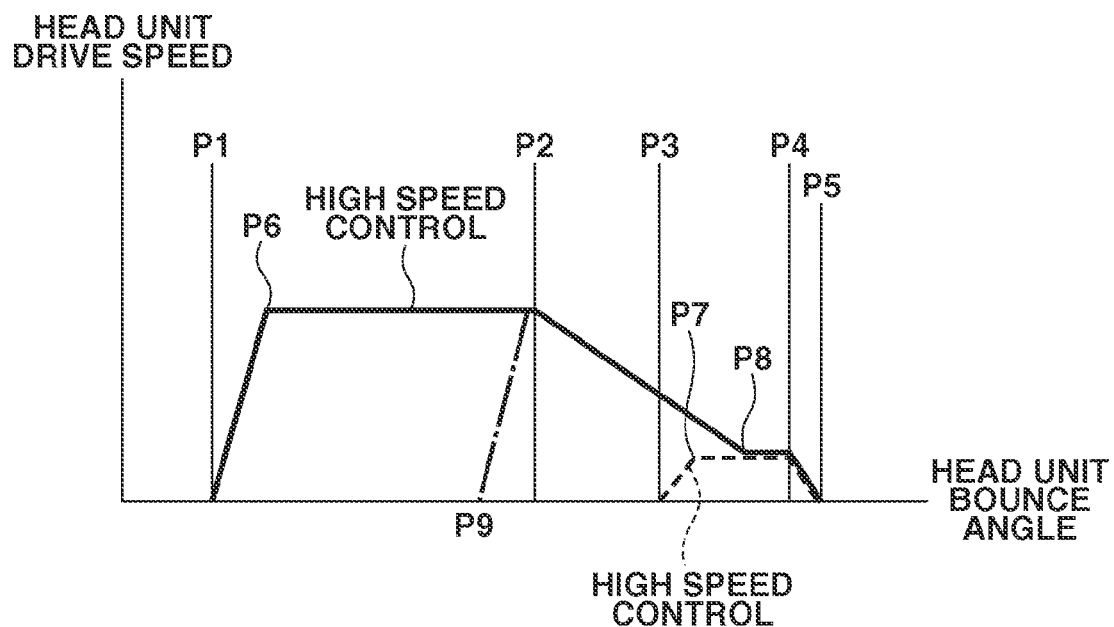
FIGS. 14A and 14B are diagrams illustrating a method for controlling a right and left drive motor 21.
Figure 14B:
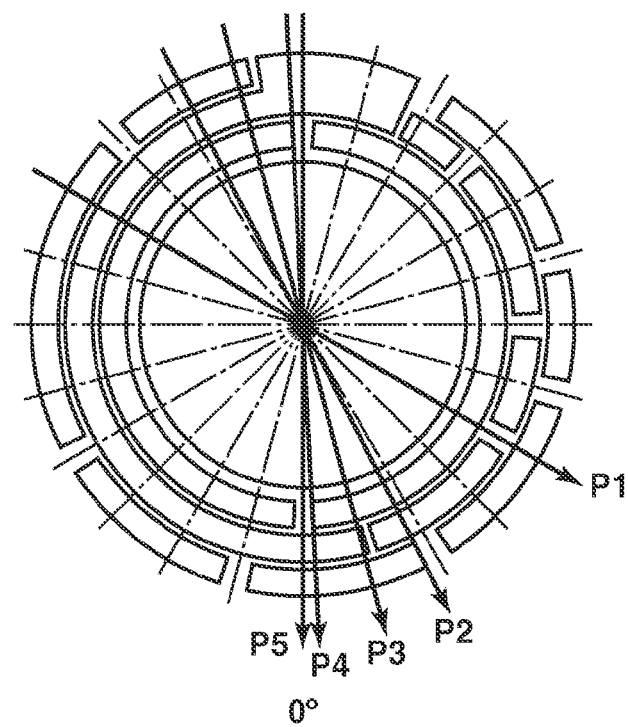

In FIG. 14A, a solid line represents the change in the driving speed in control (hereinafter, referred to as high speed control) performed for returning the head unit 2 from a relatively large bounce angle to the normal position. A dashed line represents the change in the driving speed in control (hereinafter, referred to as low speed control) performed for returning the head unit 2 from a relatively small bounce angle to the normal position. The bounce drive circuit 73 drives the right and left drive motor 21 with a general motor driver. The bounce drive circuit 73 can cause the right and left drive motor 21 to perform a normal or reverse rotation operation, pulse width modulation (PWM) drive, and a braking operation, in response to an instruction from the CPU 16. For example, the head unit 2 at the 60° bounce angle (P1) in the right direction is returned to the normal position by the high speed control. When the bounce drive circuit 73 causes the right and left drive motor 21 to perform the normal rotation (or reverse rotation) operation, the driving speed of the head unit 2 increases to reach a constant speed at a P6. When the right and left angle detection board 38 detects that the head unit 2 has reached an angle P2 before reaching the normal position, the motor control transitions to the PWM drive of using a predetermined pulse. Thus, the driving speed of the head unit 2 gradually drops to reach a constant speed by the PWM drive at P8. As soon as the bounce angle matches the angle detection pattern of the normal position at P4 with a sufficiently lowered rotational speed, both poles of the right and left drive motor 21 are short circuited to apply a brake, whereby the head unit 2 is stopped at the normal position at P5.

The low speed control is performed when, for example, the head unit 2 at the bounce angle (P3) of 15° in the right direction is returned to the normal position. The head unit 2 is started to rotate at the low speed by the PWM drive, from an initial time point at which the head unit 2 is at the position P3. Then, as in the case of the high speed control, as soon as the bounce angle matches the angle detection pattern of the normal position at P4, both poles of the right and left drive motor 21 are short circuited to apply a brake. Thus, the head unit 2 is stopped at the normal position P5. As described above, when the bounce angle before returning to the normal position does not exceed a predetermined angle from the normal position, only the low speed control is performed, because the head unit 2 might not be sufficiently slowed down, and thus might be rotated beyond the normal position with the high speed control performed in this state. Specifically, the low speed control is performed when the angle change amount of the head unit 2 is smaller than a threshold.

Thus, the brake can be applied under a stable state with a low speed, whereby the head unit 2 can be accurately stopped at the normal position. The threshold, for determining whether the high speed control or the low speed control is performed, is preferably set to be an angle change amount enabling the head unit 2 to stop at the normal position with the brake applied under a state where a stable driving speed is achieved after the high speed control is switched to the low speed control. In the graph in FIG. 14A, for example, the threshold may be set to an angle not smaller than an angle (P9) obtained by adding an angle change amount (P1 to P6), required for stabilizing the driving speed after the high speed control is started, to the bounce angle (P2) at which the high speed control is switched to the low speed control.

When the bounce angle of the head unit 2, before returning to the normal position, is equal to or larger than the predetermined angle from the normal position, first, the high speed control is performed, and then the low speed control is performed. Thus, the head unit 2 can be accurately stopped at the normal position, with a time required for returning to the normal position shortened. As described above, the high speed control is performed when the angle change amount of the head unit 2 is equal to or larger than the threshold to shorten the time required for the head unit 2 to return to the normal position. The low speed control is performed when the angle change amount is smaller than the threshold to stop the head unit 2 highly accurately.

As described above, in the present exemplary embodiment, when the bounce angle detection unit 61 detects the rotation of the head unit 2, the contact detection units 51 disposed in the head unit 2 determines whether the user has manually rotated the head unit 2. When the head unit 2 has been rotated by the accidental external force, and not by the operation of the user, the head unit 2 is immediately returned to the original bounce angle. Thus, even when the light emitting direction is shifted to a direction unintended by the user by the accidental external force, the object can be appropriately illuminated with the illumination light.

Furthermore, the clutch mechanism 64 needs not to have extremely high coupling force to stabilize the position of the head unit 2. The click mechanism, which hinders the driving operation of the motor, needs not to be provided. The high-output, large-scale motor that overcomes the click mechanism needs not to be selected. The lock mechanism, which is required to be unlocked when the head unit 2 is rotated, is not required. All things considered, the configuration is not complicated, and the head unit drive mechanism can have a configuration with minimum possible rigidity and output. Thus, the flash device, featuring a small size and a low cost at least at a portion of the head unit drive mechanism, can be provided.

In the present exemplary embodiment, the boards having the signal patterns with maximum of 7 bits and the contact brushes are used as the bounce angle detection unit 61. The bounce angle detection unit 61 is not limited to the configuration described in the present exemplary embodiment. For example, the resolution for the angle detection and the like can be appropriately changed in accordance with the specification of the flash device. More specifically, any one of an optical detection method, an absolute encoder, and the like may be used as appropriate. The rotation of the head unit 2 may be controlled by a combination of a pulse motor (or a rotation pulse plate provided in the drive mechanism) and the bounce angle detection unit 61 with a relatively low resolution.

In the present exemplary embodiment, whether the touch sensors 51, disposed at the two positions, have both detected the contact is determined to determine whether the head unit 2 has been manually rotated by the user. Alternatively, whether the head unit 2 has been manually rotated by the user may be determined based on the contact detection of the touch sensor 51 at a single position and contact detection time.

Figure 12:
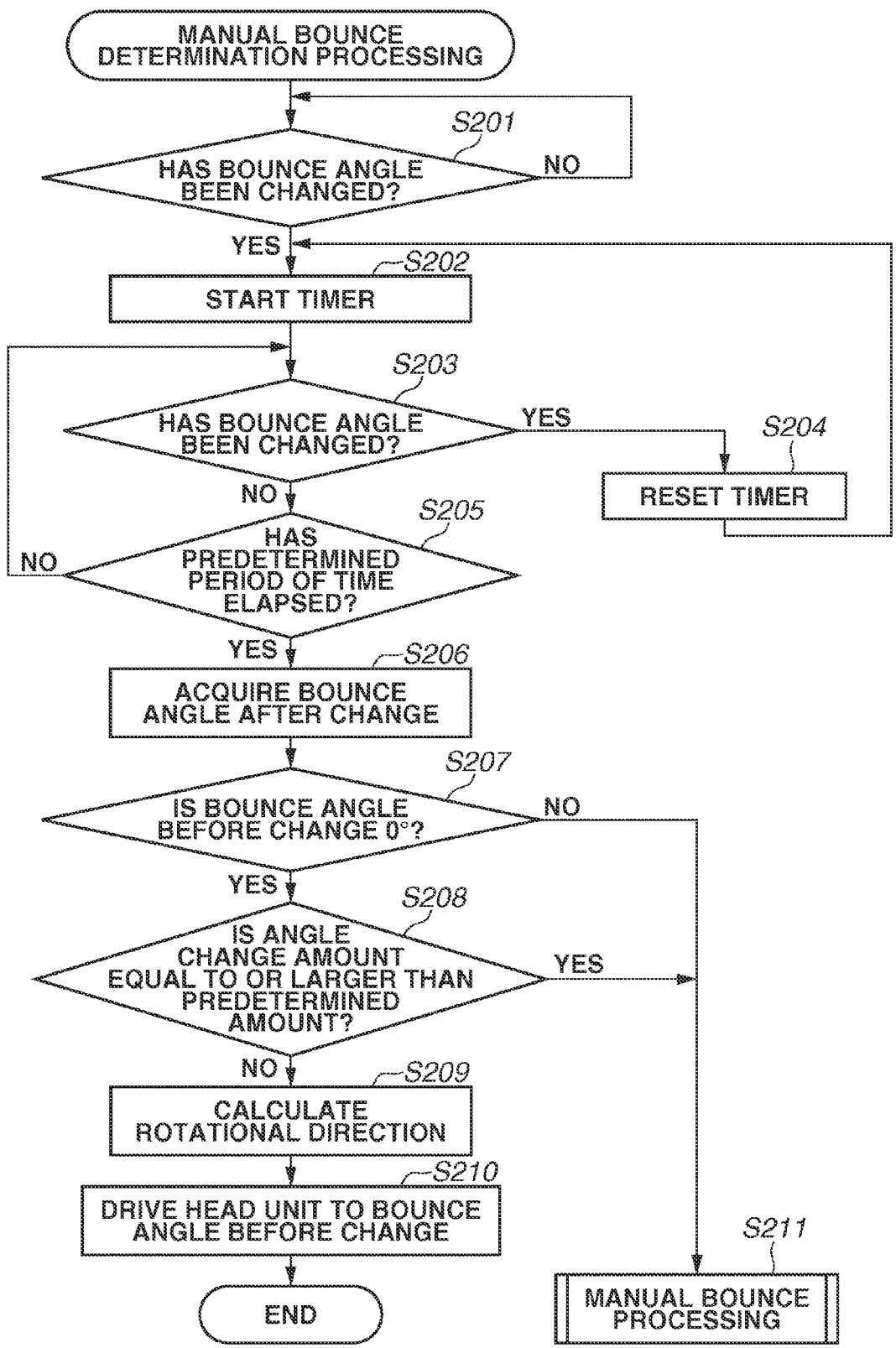
FIG. 12 is a flowchart illustrating manual bounce determination processing according to a second exemplary embodiment.

FIG. 12 is a flowchart illustrating manual bounce determination processing according to a second exemplary embodiment. The manual bounce determination processing according to the present exemplary embodiment is different from the manual bounce determination processing in the first exemplary embodiment, in that the touch sensor is not used. More specifically, the illumination device according to the present exemplary embodiment requires no touch sensor of the flash device described in the first exemplary embodiment. Thus, the illumination device according to the present exemplary embodiment uses a flash device different from the flash device described in the first exemplary embodiment in that the touch sensors 51 are not provided. The configuration of the flash device will not be described in detail.

In step S201, which is a routine for detecting a change in an angle of the head unit 2, the CPU 16 constantly monitors the change in a signal from the bounce angle detection unit 61. When any one of the signals from the bounce angle detection unit 61 is switched by the rotation of the head unit 2 caused by the external force (YES in step S201), the processing proceeds to step S202 where the CPU 16 starts the timer. Then, in step S203 the CPU 16 waits for the bounce angle to change, and thus again determines whether the head unit 2 has been rotated by the external force. When the bounce angle changes (YES in step S203), the processing proceeds to step S204. In step S204, the CPU 16 resets the timer, and the processing returns to step S202, and thus the CPU 16 starts the timer, and again waits for the bounce angle to change. While the CPU 16 detects no change in the bounce angle in step S203 (NO in step S203), the processing proceeds to step S205 at predetermined intervals. In step S205, the CPU 16 determines whether a predetermined period of time has elapsed based on the timer. When the predetermined period of time has not elapsed yet (NO in step S205), the processing returns to step S203, and thus the CPU 16 again waits for the bounce angle to change.

When the timer indicates that the predetermined period of time has elapsed in step S205 (YES in step S205), the CPU 16 determines that the rotation of the head unit 2, caused by the external force, is completed, and the processing proceeds to step S206. In step S206, the CPU 16 acquires the bounce angle after the change from the bounce angle detection unit 61. In the next step S207, the CPU 16 determines whether the bounce angle before the change, stored in the bounce angle storage unit 72, corresponds to the normal position (0°). When the bounce angle before the change does not correspond to the normal position (0°) (NO in step S207), the CPU 16 determines that the user has set the bounce angle as desired before the angle change, and the processing proceeds to step S211, and thus proceeds to the manual bounce processing described by referring to FIG. 11. When the angle of the head unit 2 before the angle change corresponds to the normal position (0°) (YES in step S207), the processing proceeds to step S208. In step S208, the CPU 16 calculates the angle change amount from the state before the change (i.e., the normal position state), and determines whether the angle change amount is equal to or larger than a predetermined amount. In other words, in steps S207 and S208, the CPU 16 selects between a first mode and a second mode. When the first mode is selected, the processing in step S209 and step S210 is performed. When the second mode is selected, the processing in step S211 and after is performed. When the angle change amount is equal to or larger than the predetermined amount (YES in step S208), the CPU 16 determines that the user has manually set the bounce angle, and the processing proceeds to step S211, and thus proceeds to the manual bounce processing. When the angle change amount is smaller than the predetermined amount (NO in step S208), the CPU 16 determines that the head unit 2 has been rotated by the accidental external force, and the processing proceeds to step S209. In step S209, the CPU 16 calculates the direction of the rotation of the head unit 2 caused by the external force. The rotational direction is calculated from the difference between the bounce angle of the head unit 2 before the angle change is detected, stored in the bounce angle storage unit 72, and the bounce angle of the head unit 2 after the angle change, acquired in step S206. Then, the processing proceeds to step S210. In step S210, the CPU 16 forces the head unit 2 to return to the bounce angle before the angle change is detected, stored in the bounce angle storage unit 72, in accordance with the angle of the rotation thus calculated. Here, the CPU 16 uses at least one of the right and left direction drive mechanism 62 and upper and lower direction drive mechanism 63.

This exemplary embodiment focuses on a fact that the accidental rotation of the head unit 2, used at the normal position, largely affects the resultant picture. Thus, the angle change from the frequently used normal position state is prevented. The processing in only one of steps S207 and 208 may be executed.

The threshold (predetermined amount) of the angle change amount, used in the determination in step S208, is preferably around 45° considering a resolution of the bounce angle detection in the present exemplary embodiment. With this threshold, the CPU 16 determines that the angle is changed by the manual operation of the user when the bounce angle is changed by 45° or more, even when the angle is actually changed by the accidental external force. Still, the user is likely to visually recognize the abnormality when the bounce angle is accidentally changed by 45° or more by the external force, and thus is likely to make the head unit 2 return to the original position with his or her hand. When the threshold is smaller than 45°, the user can set a larger number of bounce angles through the manual operation, but has less chance of visually recognizing the abnormality, when the accidental angle change, in such a level to be determined as the user's manual operation, is caused by the external force. Thus, the threshold is preferably a relatively large value. It is a matter of course that if the resolution of the bounce angle detection is high, the threshold can be set to a larger angle, such as an angle slightly smaller than 60°, for example. In the present exemplary embodiment, whether the manual operation is performed by the user is determined based on the angle change amount, and thus the object can be appropriately illuminated with illumination light even when the light emitting direction is shifted to a direction unintended by the user by the accidental external force, with a lower cost than in the first exemplary embodiment.

Figure 9C:
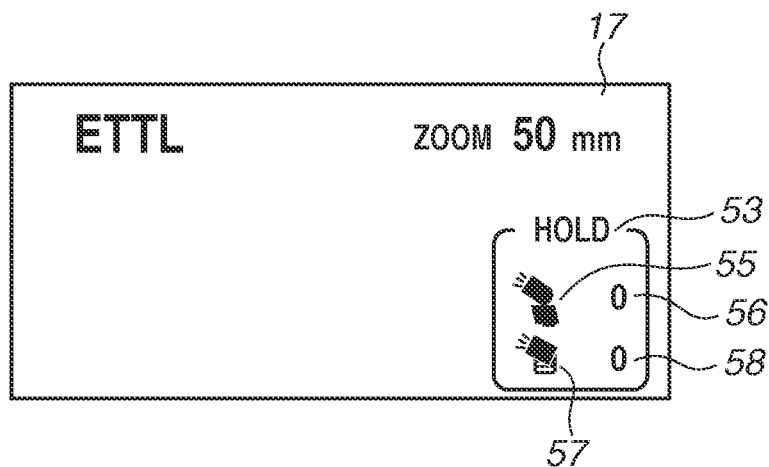

In a third exemplary embodiment, a hold mode is selectable with the operation button 8, in addition to the auto bounce mode and the manual bounce mode selectable by the operation button 8 as described in the first exemplary embodiment. In the hold mode, the bounce angle is held at an angle displayed on the LCD 17. As will be described below, when the bounce angle in each of the upper and lower direction and the right and left direction is set to 0° for example, the head unit 2 is constantly fixed to be in the normal position state. When the hold mode is activated, an index 53 of "HOLD", is displayed on the lower right portion of the LCD 17 as illustrated in FIG. 9C. The illumination device according to the present exemplary embodiment has the same configuration as the flash device 1 described in the second exemplary embodiment, except that the hold mode is selectable, and thus will not be described in detail.

Figure 13:
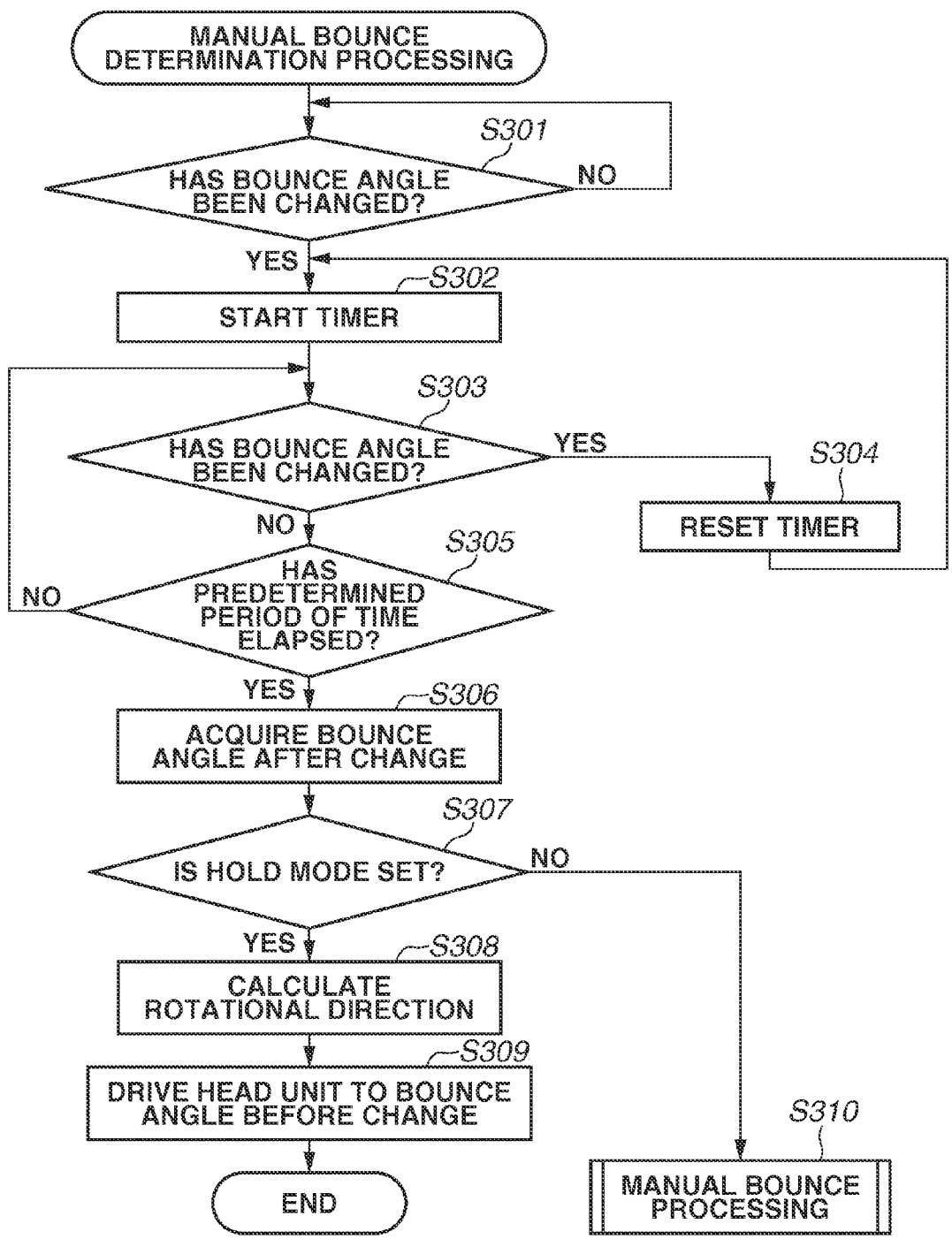
FIG. 13 is a flowchart illustrating manual bounce determination processing according to a third exemplary embodiment.

FIG. 13 is a flowchart illustrating manual bounce determination processing according to the third exemplary embodiment. The processing in step S301 to S306 in the flowchart in FIG. 13 is the same as the processing in steps S201 to S206 in the flowchart in FIG. 12, and thus will not be described.

After step S306, in step S307, the CPU 16 determines whether the hold mode is set. When the hold mode is set (YES in step S307), the CPU 16 determines that the change in the bounce angle is caused solely by the accidental external force, and the processing proceeds to step S308. In step S308, the CPU 16 calculates the direction of rotation of the head unit 2 caused by the external force, from the difference between the bounce angle of the head unit 2 before the angle change is detected, stored in the bounce angle storage unit 72, and the bounce angle of the head unit 2 after the angle change, acquired in step S306, and the processing proceeds to step S309. In step S309, the CPU 16 forces the head unit 2 to return to the angle before the angle change is detected, stored in the bounce angle storage unit 72, with the right and left direction drive mechanism 62 and/or the upper and lower direction drive mechanism 63, in accordance with the rotational direction thus calculated.

In step S307, when the CPU 16 determines that the hold mode is not set (NO in step S307), the processing proceeds to step S310, and thus proceeds to the manual bounce processing described above. More specifically, in step S307, the CPU 16 selects one of a first mode of performing the processing in steps S308 and S309 and a second mode of performing the processing in step S310 and after.

As described above, in the present exemplary embodiment, whether the manual operation is performed by the user is determined based on whether a predetermined mode is set (whether the hold mode is set). Thus, the object can be appropriately illuminated with illumination light even when the light emitting direction is shifted to a direction unintended by the user by the accidental external force, with a lower cost than in the first exemplary embodiment.

When the CPU 16 determines that the hold mode is not set in step S307 in the flowchart in FIG. 13, the processing may proceed to the steps subsequent to step S207 in FIG. 12, instead of simply proceeding to the manual bounce processing as illustrated in the flowchart in FIG. 11. Thus, whether the user has performed the manual operation can be more accurately determined with a lower cost.

In the three exemplary embodiments described above, cases where predetermined conditions for selecting between the modes are that the contact is detected on both side surfaces of the head unit 2, the angle change amount due to the external force is equal to or larger than a predetermined amount, and that the predetermined mode is not selected. When the conditions are not satisfied, the head unit 2 is returned to a position before rotation. When the conditions are satisfied, the head unit 2 is not returned to the position before rotation. Thus, the object can be appropriately illuminated with the illumination light as the user intended, even when the light emitting direction is shifted to a direction unintended by the user by the accidental external force. As a modification of the three exemplary embodiments, the head unit 2 may be returned to the position before the rotation regardless of the condition of the rotation of the head unit 2. This modification can also provide the effect that the object can be appropriately illuminated with illumination light even when the light emitting direction is shifted to a direction unintended by the user by the accidental external force.

The three exemplary embodiments described above are described with respect to an illumination device, of which the light emitting direction is changeable in the right and left direction and the upper and lower direction. Alternatively, an illumination device, of which the light emitting direction is changeable in only one of the right and left direction and the upper and lower direction is applicable.

The three exemplary embodiments described above are described with respect to a flash device mountable to the camera. Alternatively, a built-in illumination device provided in an imaging apparatus is applicable.

According to the present disclosure, an object can be appropriately illuminated with illumination light, even when a light emitting direction is shifted to a direction unintended by the user by the accidental external force.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-179271, filed Aug. 30, 2013, which is hereby incorporated by reference herein in its entirety.

What is claimed is:

1. An illumination comprising:
    a first casing;
    a second casing including a light emitting unit configured to be rotatable relative to the first casing;
    a drive unit configured to rotate the second casing relative to the first casing;
    a detection unit configured to detect rotation of the second casing relative to the first casing;
    a control unit configured to select any one of a first mode, in which, when the detection unit detects the rotation of the second casing even when the second casing is not rotated by the drive unit, the control unit causes the drive unit to rotate the second casing to a position of the second casing before the rotation of the second casing is detected by the detection unit, or a second mode, in which, when the detection unit detects the rotation of the second casing even when the second casing is not rotated by the drive unit, the control unit does not cause the drive unit to rotate the second casing to the position of the second casing before the rotation of the second casing is detected by the detection unit; and
    a contact detection unit including a plurality of contact detectors disposed at a plurality of positions of the second casing,
    wherein the control unit selects the second mode when the detection unit detects the rotation of the second casing even when the second casing is not rotated by the drive unit and the contact detection unit detects contact of an object at the plurality of positions of the casing.

2. The illumination device according to claim 1, wherein the plurality of contact detectors is disposed on a first surface of the second casing and on a second surface of the second casing different from the first surface.

3. The illumination device according to claim 2, wherein the first surface and the second surface are parallel with each other.

4. An illumination device comprising:
    a first casing;
    a second casing including a light emitting unit configured to be rotatable relative to the first casing;
    a drive unit configured to rotate the second casing relative to the first casing;
    a detection unit configured to detect rotation of the second casing relative to the first casing;
    a control unit configured to select any one of a first mode, in which, when the detection unit detects the rotation of the second casing even when the second casing is not rotated by the drive unit, the control unit causes the drive unit to rotate the second casing to a position of the second casing before the rotation of the second casing is detected by the detection unit, or a second mode, in which, when the detection unit detects the rotation of the second casing even when the second casing is not rotated by the drive unit, the control unit does not cause the drive unit to rotate the second casing to the position of the second casing before the rotation of the second casing is detected by the detection unit;

a contact detection unit including a contact detector disposed on the second casing; and a timer configured to measure a time period during which the contact detection unit is detecting contact of an object, wherein the control unit selects the second mode when the detection unit detects the rotation of the second casing even when the second casing is not rotated by the drive unit and the time period measured by the timer is greater than or equal to a predetermined value.

5. An illumination control method for an illumination device including a first casing, a second casing including a light emitting unit and configured to be rotatable relative to the first casing, a contact detection unit including a plurality of contact detectors disposed at a plurality of positions of the second casing, and a drive unit configured to rotate the second casing relative to the first casing, the illumination control method comprising:

detecting that the second casing is rotated relative to the first casing; and selecting any one of a first mode, in which, when the rotation of the second casing is detected even when the second casing is not rotated by the drive unit, the drive unit rotates the second casing to a position of the second casing before the rotation of the second casing is detected in the detecting, or a second mode, in which, when the rotation of the second casing is detected in the detecting even when the second casing is not rotated by the drive unit, the drive unit does not rotate the second casing to the position of the second casing before the rotation of the second casing is detected, wherein the second mode is selected when the rotation of the second casing is detected even when the second casing is not rotated by the drive unit and the contact detection unit detects contact of an object at the plurality of positions of the casing.

6. An illumination control method for an illumination device including a first casing, a second casing including a light emitting unit and configured to be rotatable relative to the first casing, a contact detection unit including a contact detector disposed on the second casing; and a timer configured to measure a time period during which the contact detection unit is detecting contact of an object, and a drive unit configured to rotate the second casing relative to the first casing, the illumination control method comprising:

detecting that the second casing is rotated relative to the first casing; and selecting any one of a first mode, in which, when the rotation of the second casing is detected even when the second casing is not rotated by the drive unit, the drive unit rotates the second casing to a position of the second casing before the rotation of the second casing is detected in the detecting, or a second mode, in which, when the rotation of the second casing is detected in the detecting even when the second casing is not rotated by the drive unit, the drive unit does not rotate the second casing to the position of the second casing before the rotation of the second casing is detected, wherein the second mode is selected when the rotation of the second casing is detected even when the second casing is not rotated by the drive unit and the time period measured by the timer is greater than or equal to a predetermined value.

7. The illumination control method according to claim 5, wherein the plurality of contact detectors is disposed on a first surface of the second casing and on a second surface of the second casing different from the first surface.

8. The illumination control method according to claim 7, wherein the first surface and the second surface are parallel with each other.

* * * * *